(12) United States Patent
Arroyo et al.

(10) Patent No.: US 12,182,703 B2
(45) Date of Patent: Dec. 31, 2024

(54) METHODS AND APPARATUS TO DETECT A TEXT REGION OF INTEREST IN A DIGITAL IMAGE USING MACHINE-BASED ANALYSIS

(71) Applicant: Nielsen Consumer LLC, New York, NY (US)

(72) Inventors: Roberto Arroyo, Madrid (ES); Javier Tovar Velasco, Valladolid (ES); Francisco Javier Delgado Del Hoyo, Valladolid (ES); Diego González Serrador, Valladolid (ES); Emilio Almazán, Madrid (ES); Antonio Hurtado, Valladolid (ES)

(73) Assignee: Nielsen Consumer LLC, Chicago, IL (US)

( * ) Notice: Subject to any disclaimer, the term of this patent is extended or adjusted under 35 U.S.C. 154(b) by 258 days.

(21) Appl. No.: 17/598,792

(22) PCT Filed: Mar. 28, 2019

(86) PCT No.: PCT/IB2019/000299
§ 371 (c)(1),
(2) Date: Sep. 27, 2021

(87) PCT Pub. No.: WO2020/194004
PCT Pub. Date: Oct. 1, 2020

(65) Prior Publication Data
US 2022/0189190 A1    Jun. 16, 2022

(51) Int. Cl.
*G06V 30/413* (2022.01)
*G06N 3/08* (2023.01)
(Continued)

(52) U.S. Cl.
CPC ............... *G06N 3/08* (2013.01); *G06V 10/25* (2022.01); *G06V 10/82* (2022.01); *G06V 20/62* (2022.01);
(Continued)

(58) Field of Classification Search
CPC .... G06V 10/82; G06V 30/413; G06V 30/416; G06V 2201/10
See application file for complete search history.

(56) References Cited

U.S. PATENT DOCUMENTS 3,323,135 A    6/1967  Miller
5,410,611 A    4/1995  Huttenlocher et al.
(Continued)

FOREIGN PATENT DOCUMENTS

CA    2957433 C    6/2020
CN    103123685    5/2013
(Continued)

OTHER PUBLICATIONS

International Searching Authority, "International Search Report," mailed in connection with International Patent Application No. PCT/IB2019/000299, on Dec. 23, 2019, 3 pages.
(Continued)

*Primary Examiner* — Bobbak Safaipour
*Assistant Examiner* — Ashley L. Hytrek
(74) *Attorney, Agent, or Firm* — HANLEY, FLIGHT & ZIMMERMAN, LLC

(57) ABSTRACT

Methods, apparatus, systems and articles of manufacture are disclosed to analyze characteristics of text of interest using a computing system. An example apparatus includes a text detector to provide text data from a first image, the first image including a first text region of interest and a second text region not of interest, a color-coding generator to generate a plurality of color-coded text-map images, the
(Continued)

plurality of color-coded text-map images including color-coded segments with different colors, the color-coded segments corresponding to different text characteristics, and a convolutional neural network (CNN) to determine a first location in the first image as more likely to be the first text region of interest than a second location in the first image corresponding to the second text region that is not of interest based on performing a CNN analysis on the first image and the plurality of color-coded text-map images.

20 Claims, 19 Drawing Sheets

(51) Int. Cl.
    *G06V 10/25*     (2022.01)
    *G06V 10/82*     (2022.01)
    *G06V 20/62*     (2022.01)
    *G06V 30/414*     (2022.01)
    *G06V 30/416*     (2022.01)

(52) U.S. Cl.
    CPC .......... *G06V 30/413* (2022.01); *G06V 30/414* (2022.01); *G06V 30/416* (2022.01)

(56) References Cited

U.S. PATENT DOCUMENTS

| | | | |
|---|---|---|---|
| 5,606,690 A | 2/1997 | Hunter et al. | |
| 7,454,063 B1 | 11/2008 | Kneisl et al. | |
| 7,792,709 B1 | 9/2010 | Trandal et al. | |
| 8,285,047 B2 | 10/2012 | Nagarajan et al. | |
| 8,494,281 B2 | 7/2013 | Nagarajan | |
| 8,787,695 B2 | 7/2014 | Wu | |
| 8,792,141 B2 | 7/2014 | Moore et al. | |
| 8,983,170 B2 | 3/2015 | Nepomniachtchi et al. | |
| 9,014,432 B2 | 4/2015 | Fan et al. | |
| 9,158,744 B2 | 10/2015 | Rao et al. | |
| 9,239,952 B2 | 1/2016 | Hsu | |
| 9,262,686 B1 | 2/2016 | Singer | |
| 9,290,022 B2 | 3/2016 | Makabe | |
| 9,298,685 B2 | 3/2016 | Barrus | |
| 9,298,979 B2 | 3/2016 | Nepomniachtchi et al. | |
| 9,323,135 B1 | 4/2016 | Veloso | |
| 9,324,073 B2 | 4/2016 | Nepomniachtchi et al. | |
| 9,384,389 B1 | 7/2016 | Sankaranarayanan | |
| 9,384,839 B2 | 7/2016 | Avila et al. | |
| 9,396,540 B1 | 7/2016 | Sampson | |
| 9,684,842 B2 | 6/2017 | Deng | |
| 9,710,702 B2 | 7/2017 | Nepomniachtchi et al. | |
| 9,747,504 B2 | 8/2017 | Ma et al. | |
| 9,760,786 B2 | 9/2017 | Sahagun et al. | |
| 9,824,270 B1 | 11/2017 | Mao | |
| 9,875,385 B1 | 1/2018 | Humphreys | |
| 10,032,072 B1* | 7/2018 | Tran ......................... G06F 18/28 | |
| 10,157,425 B2 | 12/2018 | Chelst et al. | |
| 10,235,585 B2 | 3/2019 | Deng | |
| 10,242,285 B2 | 3/2019 | Thrasher et al. | |
| 10,395,772 B1 | 8/2019 | Lucas et al. | |
| 10,679,283 B1 | 6/2020 | Pesce | |
| 11,257,049 B1 | 2/2022 | Durazo Almeida | |
| 11,321,956 B1 | 5/2022 | Geng | |
| 11,410,446 B2 | 8/2022 | Shanmuganathan et al. | |
| 11,414,053 B2 | 8/2022 | Tanaami et al. | |
| 11,468,491 B2 | 10/2022 | Dalal | |
| 11,476,981 B2 | 10/2022 | Wei et al. | |
| 11,562,557 B2 | 1/2023 | Miginnis et al. | |
| 11,587,148 B2 | 2/2023 | Elder | |
| 11,593,552 B2 | 2/2023 | Sarkar | |
| 11,609,956 B2 | 3/2023 | Jain | |
| 11,625,930 B2 | 4/2023 | Rodriguez et al. | |
| 11,810,383 B2 | 11/2023 | Patel et al. | |
| 11,842,035 B2 | 12/2023 | Jahjah et al. | |
| 2002/0037097 A1 | 3/2002 | Hoyos et al. | |
| 2003/0185448 A1 | 10/2003 | Seeger et al. | |
| 2006/0232619 A1 | 10/2006 | Otsuka et al. | |
| 2007/0041642 A1 | 2/2007 | Romanoff et al. | |
| 2008/0205759 A1 | 8/2008 | Zandifar et al. | |
| 2009/0164422 A1 | 6/2009 | Pacella | |
| 2010/0306080 A1 | 12/2010 | Trandal et al. | |
| 2011/0122443 A1 | 5/2011 | Otsuka et al. | |
| 2011/0243445 A1 | 10/2011 | Uzelac et al. | |
| 2011/0289395 A1 | 11/2011 | Breuel et al. | |
| 2011/0311145 A1 | 12/2011 | Bern et al. | |
| 2012/0183211 A1 | 7/2012 | Hsu et al. | |
| 2012/0274953 A1 | 11/2012 | Makabe | |
| 2012/0330971 A1 | 12/2012 | Thomas et al. | |
| 2013/0058575 A1 | 3/2013 | Koo et al. | |
| 2013/0170741 A9 | 7/2013 | Hsu et al. | |
| 2014/0002868 A1 | 1/2014 | Landa et al. | |
| 2014/0064618 A1 | 3/2014 | Janssen, Jr. | |
| 2014/0188647 A1 | 7/2014 | Argue | |
| 2014/0195891 A1 | 7/2014 | Venkata Radha Krishna Rao et al. | |
| 2015/0039479 A1 | 2/2015 | Gotanda | |
| 2015/0127428 A1 | 5/2015 | Gharachorloo | |
| 2015/0169951 A1 | 6/2015 | Khintsitskiy et al. | |
| 2015/0254778 A1 | 9/2015 | Kmak et al. | |
| 2015/0317642 A1 | 11/2015 | Argue | |
| 2015/0363792 A1 | 12/2015 | Arini | |
| 2015/0363822 A1 | 12/2015 | Rowe | |
| 2016/0005189 A1 | 1/2016 | Gray | |
| 2016/0034863 A1 | 2/2016 | Ross | |
| 2016/0063469 A1 | 3/2016 | Etzion | |
| 2016/0125383 A1 | 5/2016 | Chan | |
| 2016/0171585 A1 | 6/2016 | Singh | |
| 2016/0203625 A1 | 7/2016 | Khan et al. | |
| 2016/0210507 A1 | 7/2016 | Abdollahian | |
| 2016/0234431 A1 | 8/2016 | Kraft et al. | |
| 2016/0307059 A1 | 10/2016 | Chaudhury et al. | |
| 2016/0342863 A1* | 11/2016 | Kwon ................. G06V 10/454 | |
| 2017/0293819 A1 | 10/2017 | Deng | |
| 2018/0005345 A1 | 1/2018 | Apodaca et al. | |
| 2018/0053045 A1 | 2/2018 | Lorenzini et al. | |
| 2018/0060302 A1 | 3/2018 | Liang et al. | |
| 2018/0317116 A1 | 11/2018 | Komissarov et al. | |
| 2019/0026803 A1 | 1/2019 | De Guzman | |
| 2019/0050639 A1* | 2/2019 | Ast ......................... G06F 40/30 | |
| 2019/0080207 A1* | 3/2019 | Chang ................. G06F 16/7837 | |
| 2019/0171900 A1 | 6/2019 | Thrasher et al. | |
| 2019/0244020 A1 | 8/2019 | Yoshino et al. | |
| 2019/0325211 A1 | 10/2019 | Ordonez et al. | |
| 2019/0332662 A1 | 10/2019 | Middendorf et al. | |
| 2019/0354818 A1 | 11/2019 | Reisswig et al. | |
| 2020/0097718 A1 | 3/2020 | Schäfer | |
| 2020/0142856 A1 | 5/2020 | Neelamana | |
| 2020/0151444 A1 | 5/2020 | Price et al. | |
| 2020/0151902 A1 | 5/2020 | Almazán | |
| 2020/0175267 A1 | 6/2020 | Schäfer et al. | |
| 2020/0249803 A1 | 8/2020 | Sobel et al. | |
| 2020/0364451 A1 | 11/2020 | Ammar et al. | |
| 2020/0401798 A1 | 12/2020 | Foncubierta Rodriguez et al. | |
| 2020/0410231 A1 | 12/2020 | Chua et al. | |
| 2021/0004880 A1 | 1/2021 | Benkreira et al. | |
| 2021/0019287 A1 | 1/2021 | Prasad et al. | |
| 2021/0034856 A1 | 2/2021 | Torres et al. | |
| 2021/0090694 A1 | 3/2021 | Colley et al. | |
| 2021/0117665 A1 | 4/2021 | Simantov et al. | |
| 2021/0117668 A1 | 4/2021 | Zhong et al. | |
| 2021/0142092 A1 | 5/2021 | Zhao et al. | |
| 2021/0149926 A1 | 5/2021 | Komninos et al. | |
| 2021/0158038 A1 | 5/2021 | Shanmuganathan et al. | |
| 2021/0216765 A1 | 7/2021 | Xu | |
| 2021/0248420 A1 | 8/2021 | Zhong et al. | |
| 2021/0295101 A1 | 9/2021 | Tang et al. | |
| 2021/0319217 A1 | 10/2021 | Wang et al. | |
| 2021/0334737 A1 | 10/2021 | Balaji | |
| 2021/0343030 A1 | 11/2021 | Sagonas et al. | |
| 2021/0357710 A1 | 11/2021 | Zhang et al. | |
| 2021/0406533 A1 | 12/2021 | Arroyo et al. | |
| 2022/0004756 A1 | 1/2022 | Jennings | |
| 2022/0114821 A1 | 4/2022 | Arroyo et al. | |
| 2022/0189190 A1 | 6/2022 | Arroyo et al. | |

(56) References Cited

U.S. PATENT DOCUMENTS

| | | | |
|---|---|---|---|
| 2022/0198185 | A1 | 6/2022 | Prebble |
| 2022/0383651 | A1 | 12/2022 | Shanmuganathan et al. |
| 2022/0397809 | A1 | 12/2022 | Talpade et al. |
| 2022/0414630 | A1 | 12/2022 | Yebes Torres et al. |
| 2023/0004748 | A1 | 1/2023 | Rodriguez et al. |
| 2023/0005286 | A1 | 1/2023 | Yebes Torres et al. |
| 2023/0008198 | A1 | 1/2023 | Gadde et al. |
| 2023/0196806 | A1 | 6/2023 | Ramalingam et al. |
| 2023/0214899 | A1 | 7/2023 | Martínez Cebrián et al. |
| 2023/0230408 | A1 | 7/2023 | Arroyo et al. |
| 2023/0394859 | A1 | 12/2023 | Montero et al. |

FOREIGN PATENT DOCUMENTS

| | | | | |
|---|---|---|---|---|
| CN | 104866849 | | 8/2015 | |
| CN | 104866849 | A * | 8/2015 | |
| CN | 108229397 | | 6/2018 | |
| CN | 108829397 | A | 11/2018 | |
| CN | 109389124 | A | 2/2019 | |
| CN | 112446351 | A | 3/2021 | |
| CN | 112560862 | A | 3/2021 | |
| DE | 202013005144 | U1 | 10/2013 | |
| GB | 2595412 | A | 11/2021 | |
| JP | H0749529 | A | 2/1995 | |
| JP | 2008211850 | A | 9/2008 | |
| JP | 2019139737 | A | 8/2019 | |
| JP | 7049529 | B2 | 4/2022 | |
| KR | 10-1831204 | | 2/2018 | |
| KR | 101831204 | B1 * | 2/2018 | |
| WO | 2013044145 | A1 | 3/2013 | |
| WO | WO-2018054326 | A1 * | 3/2018 | ............ G06K 9/342 |
| WO | 2018201423 | A1 | 11/2018 | |
| WO | 2020194004 | A1 | 10/2020 | |
| WO | 2022006295 | A1 | 1/2022 | |
| WO | 2022123199 | A1 | 6/2022 | |

OTHER PUBLICATIONS

International Searching Authority, "Written Opinion," mailed in connection with International Patent Application No. PCT/IB2019/000299, on Dec. 23, 2019, 4 pages.

Bartz et al., "STN-OCT: A Single Neural Network for Text Detection and Text Recognition," Computer Science, Jul. 27, 2017, 9 pages.

Ivan Ozhiganov, et al. "Deep Dive Into OCR for Receipt Recognition," DZone, Jun. 21, 2017, 19, pages.

NielsenIQ Brandbank, "Nielsen Brandbank Product Library," Online Available. Retrieved on Apr. 1, 2022. 5 pages. [retrieved from: https://www.brandbank.com/us/product-library/].

Github, "FIAT tool—Fast Image Data Annotation Tool," Github.com, downloaded on Apr. 1, 2022, 30 pages, [retrieved from: https://github.com/christopher5106/FastAimotation Tool].

United States Patent and Trademark Office, "Notice of Allowance and Fee(s)Due," issued in connection with U.S. Appl. No. 16/692,797, issued Apr. 5, 2022, 10 pages.

United States Patent and Trademark Office, "Corrected Notice of Allowability," issued in connection with U.S. Appl. No. 16/692,797, dated Apr. 22, 2022, 3 pages.

International Searching Authority, "International Preliminary Report on Patentability," mailed in connection with International Patent Application No. PCT/US2020/061269, on May 17, 2022, 5 pages.

Gu et al.," XYLayoutLM: Towards Layout-Aware Multimodal Networks for Visually-Rich Document Understanding," Conference on Computer Vision and Pattern Recognition ( CVPR), Jun. 18, 2022, 10 pages.

European Patent Office, "Communication pursuant to Rules 161(2) and 162 EPC," issuedin connection with Application No. 20891012. 5, dated Jun. 29, 2022, 3 pages.

Datasetlist, "A tool using OpenCV to annotate images for image classification, optical character reading, . . . ," Datasetlist.com, dated Jul. 13, 2022, 30 pages.

Villota et al. "Text Classification Models for Form Entity Linking", arXiv, 2021, 10 pages.

United States Patent and Trademark Office, "Non-Final Office Action," issued in connection with U.S. Appl. No. 17/345,940, dated Aug. 18, 2022, 8 pages.

United States Patent and Trademark Office, "Non-Final Office Action" , issued in connection with U.S. Appl. No. 17/075,675, issued Sep. 22, 2022, 12 Pages.

Huang et al., "LayoutLMv3: Pre-training for Document AI with Unified Text and Image Masking," 30th ACM International Conference on Multimedia, Oct. 2022, 10 pages.

Zhang et al.,"Multimodal Pre-training Based on Graph Attention Network for Document Understanding." IEEE Transactions on Multimedia, vol. 25, Oct. 12, 2022, 13 pages.

European Patent Office, "Extended European Search Report," issued in connection with European Patent Application No. 19921870, dated Oct. 12, 2022, 11 pages.

International Searching Authority, "International Search Report," issued in connection with International Patent Application No. PCT/US2022/034570, mailed on Oct. 20, 2022, 3 pages.

International Searching Authority, "Written Opinion," issued in connection with International Patent Application No. PCT/US2022/034570, mailed on Oct. 20, 2022, 5 pages.

Kim et al., "Donut: Document Understanding Transformer without OCR", arXiv, dated 2021, 29 pages.

United States Patent and Trademark Office, "Notice of Allowance and Fee(s) Due," issued in connection with U.S. Appl. No. 17/364,419, dated Nov. 4, 2022, 10 pages.

Canadian Patent Office, "Examiner's Report," issued in connection with Canadian Patent Application No. 3,124,868, mailed on Nov. 10, 2022, 4 pages.

United States Patent and Trademark Office, "Corrected Notice of Allowability", issued in connection with U.S. Appl. No. 17/364,419, dated Nov. 15, 2022, 2 pages.

Zhong et al., "Hierarchical Message-Passing Graph Neural Networks," Data Mining and Knowledge Discovery, Nov. 17, 2022, 28 pages.

European Patent Office, "European Search Report," issued in connection with European patent appl. No. 22180113.7-1207, Nov. 22, 2022, 25 pages.

Dwivedi et al., "Benchmarking Graph Neural Networks," Journal of Machine Learning Research, Dec. 2022, 49 pages.

European Patent Office, "Extended European Search Report," issued in connection with European Patent Application No. 22184405.3, dated Dec. 2, 2022, 4 pages.

United States Patent and Trademark Office, "Non-Final Office Action," issued in connection with U.S. Appl. No. 17/379,280, dated Dec. 2, 2022, 14 Pages.

International Searching Authority, "International Preliminary Report on Patentability," issued in connection with PCT No. PCT/US2021/039931, issued Dec. 13, 2022, 5 pages.

United States Patent and Trademark Office, "Corrected Notice of Allowability," issued in connection with U.S. Appl. No. 17/364,419, dated Jan. 4, 2023, 2 pages.

United States Patent and Trademark Office, "Non-Final Office Action," issued in connection with U.S. Appl. No. 17/883,309, dated Jan. 20, 2023, 14 pages.

United States Patent and Trademark Office, "Corrected Notice of Allowability", issued in connection with U.S. Appl. No. 17/364,419, filed Feb. 15, 2023, 2 pages.

United Kingdom Patent Office, "Examination Report under section 18(3)," in connection with Great Britain Patent Application No. 2112299.9, issued Feb. 17, 2023, 2 pages.

United States Patent and Trademark Office, "Final Action" issued in U.S. Appl. No. 17/075,675, on Mar. 7, 2023 (11 pages).

United States Patent and Trademark Office, "Non-Final Office Action," issued in connection with U.S. Appl. No. 17/345,940, dated Mar. 16, 2023, 13 pages.

United States Patent and Trademark Office, "Final Office Action," issued in connection with U.S. Appl. No. 17/379,280, dated May 5, 2023, 17 pages.

(56) References Cited

OTHER PUBLICATIONS

United States Patent and Trademark Office, "Notice of Allowance," issued in connection with U.S. Appl. No. 17/883,309, mailed on May 11, 2023, 9 pages.
European Patent Office, "Extended European Search Report," issued in connection with European Patent Application No. 22214553.4, dated May 17, 2023, 9 pages.
United States Patent and Trademark Office, "Advisory Action," issued in connection with U.S. Appl. No. 17/075,675, issued May 30, 2023, 3 pages.
International Searching Authority, International Search Report, issued in connection with International Patent Application No. PCT/US2023/011859, mailed on Jun. 1, 2023, 3 pages.
International Searching Authority, Written Opinion, issued in connection with International Patent Application No. PCT/US2023/011859, mailed on Jun. 1, 2023, 4 pages.
United States Patent and Trademark Office, "Notice of Allowance," issued in U.S. Appl. No. 17/075,675, mailed on Jun. 26, 2023, 8 pages.
United States Patent and Trademark Office, "Notice of Allowance and Fee(s) Due," issued in connection with U.S. Appl. No. 17/345,940, mailed on Jul. 7, 2023, 8 pages.
United Kingdom Intellectual Property Office, "Intention to Grant under Section 18(4)," issued in connection with United Kingdom Patent Application No. 2112299.9, dated Jul. 13, 2023, 2 pages.
United States Patent and Trademark Office, "Advisory Action," issued in connection with U.S. Appl. No. 17/379,280, mailed on Jul. 18, 2023, 3 pages.
Gopal et al., "What is Intelligent Document Processing?" Nano Net Technologies, URL: [https://nanonets.com/blog/intelligent-document-processing/], Jul. 19, 2023, 21 pages.
United States Patent and Trademark Office, "Corrected Notice of Allowability," issued in connection with U.S. Appl. No. 17/345,940, dated Jul. 20, 2023, 3 pages.
Canadian Intellectual Property Office, "Examiner's Report," issued in connection with Canadian Patent Application No. 3, 124,868, dated Aug. 10, 2023, 5 pages.
United States Patent and Trademark Office, "Corrected Notice of Allowability," issued in connection with U.S. Appl. No. 17/883,309, mailed on Aug. 17, 2023, 2 Pages.
United Kingdom Intellectual Property Office, "Notification of Grant," issued in connection with United Kingdom Patent Application No. 2112299.9, dated Aug. 29, 2023, 2 pages.
Amazon, "Intelligent Document Processing," Amazon Web Services, https://aws.amazon.com/machine-learning/ml-use-cases/document-processing/fintech/, retrieved on Sep. 8, 2023, 6 pages.
United States Patent and Trademark Office, "Corrected Notice of Allowability," issued in connection with U.S. Appl. No. 17/075,675, mailed on Oct. 10, 2023, 2 pages.
United States Patent and Trademark Office, "Non-Final Office Action, " issued in connection with U.S. Appl. No. 17/710,538, dated Oct. 26, 2023, 6 Pages.
European Patent Office, "Extended European Search Report," issued in connection with European Patent Application No. 20891012.5, dated Nov. 17, 2023, 12 pages.
International Searching Authority, "International Preliminary Report on Patentability," issued in connection with International Patent Application No. PCT/US2022/034570, issued on Jan. 4, 2024, 7 pages.
United States Patent and Trademark Office, "Non-Final Office Action," issued in connection with U.S. Appl. No. 18/191,642, dated Feb. 7, 2024, 18 pages.
Yadati et al., "HyperGCN: Hypergraph Convolutional Networks for Semi-Supervised Classification," Proceedings of the 33rd International Conference on Neural Information Processing Systems, Dec. 2019, 18 pages.
Github, "Tesseract OCR," Tesseract Repository on GitHub, retrieved from: https://github. com/tesseract-ocr/, dated 2020, 3 pages.
Carbonell et al., "Named Entity Recognition and Relation Extraction with Graph Neural Networks in Semi Structured Documents," 2020 International Conference on Pattern Recognition (ICPR), Jan. 10, 2021, 6 pages.
Zacharias et al., "Image Processing Based Scene-Text Detection and Recognition with Tesseract," arXiv (CoRR), dated Apr. 17, 2020, 6 pages.
Liu et al. "RoBERTa: A Robustly Optimized BERT Pretraining Approach." ArXiv abs/1907.11692, Jul. 26, 2019, 13 pages.
Xu et al., "LayoutLM: Pre-training of Text and Layout for Document Image Understanding," in International Conference on Knowledge Discovery & Data Mining (SIGKDD), Jun. 16, 2020, 9 pages. [retrieved from: https://arxiv.org/pdf/1912.13318.pdf].
Dong et al. "HNHN: Hypergraph Networks with Hyperedge Neurons," ArXiv abs/2006.12278, dated 2020, 11 pages.
Yu et al., "PICK: Processing Key Information Extraction from Documents using Improved Graph Learning—Convolutional Networks," in International Conference on Pattern Recognition (ICPR), dated Jul. 18, 2020, 8 pages. [retrieved from: https://arxiv.org/pdf/2004.07464.pdf].
Chen et al., "HGMF: Heterogeneous Graph-Based Fusion for Multimodal Data with Incompleteness," Proceedings of the 26th ACM SIGKDD International Conference on Knowledge Discovery & Data Mining, dated Aug. 20, 2020, 11 pages.
Wang et al., "DocStruct: A Multimodal Method to Extract Hierarchy Structure in Document for General Form Understanding," 2020 Conference Empirical Methods in Natural Language Processing (EMNLP), Nov. 16, 2020, 11 pages.
Zhu et al., "Heterogeneous Mini-Graph Neural Network and Its Application to Fraud Invitation Detection." 2020 IEEE International Conference on Data Mining (ICDM), Nov. 17, 2020, 9 pages.
Bandyopadhyay et al., "Hypergraph Attention Isomorphism Network by Learning Line Graph Expansion." 2020 IEEE International Conference on Big Data (Big Data) (2020): 669-678, 10 pages.
Arroyo et al., "Multi-label classification of promotions in digital leaflets using textual and visual information," Proceedings of the Workshop on Natural Language Processing in E-Commerce (EComNLP), pp. 11-20, Barcelona, Spain (Online), Dec. 12, 2020, 10 pages.
DeepDive, "Distant Supervision," Online available on Stanford University website, retrieved on Apr. 1, 2022, 2 pages, [retrieved from: http://deepdive.stanford.edu/distant supervision].
Nguyen et al. "End-to-End Hierarchical Relation Extraction for Generic Form Understanding", in International Conference on Pattern Recognition (ICPR), pp. 5238-5245, 2021, 8 pages.
International Searching Authority, "International Search Report," mailed in connection with International Patent Application No. PCT/US2020/061269, dated Mar. 11, 2021, 3 pages.
International Searching Authority, "Written Opinion," mailed in connection with International Patent Application No. PCT/US2020/061269, on Mar. 11, 2021,4 pages.
United States Patent and Trademark Office, "Non-Final Office Action," issued in connection with U.S. Appl. No. 16/692,797, dated Mar. 16, 2021, 12 pages.
Google, "Detect Text in Images," Mar. 29, 2021, 16 pages. Retrieved from http://cloud.google.com/vision/docs/ocr.
Xu et al. "LayoutXLM: Multimodal Pre-training for Multilingual Visually-rich Document Understanding", arXiv, 2021, 10 pages.
Ma et al., "Graph Attention Networks with Positional Embeddings." ArXiv abs/2105.04037, 2021, 13 pages.
Chen et al., "TextPolar: irregular scene text detection using polar representation," International Journal on Document Analysis and Recognition (IJDAR), May 23, 2021, 9 pages.
Li et al. "SelfDoc: Self-Supervised Document Representation Learning." 2021 IEEE/CVF Conference on Computer Vision and Pattern Recognition (CVPR), Jun. 20, 2021, 10 pages.
Hwang et al., "Spatial Dependency Parsing for Semi-Structured Document Information Extraction," in International Joint Conference on Natural Language Processing (IJCNLP), Jul. 1, 2021, 14 pages. [retrieved from: https://arxiv.org/pdf/2005.00642.pdf].
Li et al., "StructuralLM: Structural Pre-training for Form Understanding." 59th Annual Meeting of the Association for Computational Linguistics, Aug. 2021, 10 pages.

(56) References Cited

OTHER PUBLICATIONS

Xu et al., "LayoutLMv2: Multi-modal Pre-training for Visually-rich Document Understanding." ACL, dated 2021, 13 pages.
Huang et al. "UniGNN: a Unified Framework for Graph and Hypergraph Neural Networks." IUCAI, 2021, 9 pages.
Tang et al., "MatchVIE: Exploiting Match Relevancy between Entities for Visual Information Extraction", in International Joint Conference on Artificial Intelligence (IJCAI), pp. 1039-1045, 2021, 7 pages.
Qian et al., "A Region-Based Hypergraph Network for Joint Entity-Relation Extraction," Knowledge-Based Systems. vol. 228, Sep. 2021, 8 pages.
Prabhu et al., "MTL-FoUn: A Multi-Task Learning Approach to Form Understanding," 2021 International Conference on Document Analysis and Recognition (ICDAR), Sep. 5, 2021, 5 pages.
Davis et al., "Visual FUDGE: Form Understanding via Dynamic Graph Editing," International Conference on Document Analysis and Recognition (ICDAR), Sep. 5, 2021, 16 pages.
Shen et al., "LayoutParser: A Unified Toolkit for Deep Learning Based Document Image Analysis," in International Conference on Document Analysis and Recognition (ICDAR), Sep. 5, 2021, 16 pages. [retrieved from: https://arxiv.org/pdf/2103.15348.pdf].
Garncarek et al. "Lambert: Layout-Aware Language Modeling for Information Extraction." ICDAR, 2021, 16 pages.
Powalski et al., "Going Full-TILT Boogie on Document Understanding with Text-Image-Layout Transformer," International Conference on Document Analysis and Recognition, Sep. 5, 2021, 17 pages.
Hong et al., "BROS: A Pre-trained Language Model Focusing on Text and Layout for Better Key Information Extraction from Documents," arXiv (CoRR), Sep. 10, 2021, 13 pages. [retrieved from: https://arxiv.org/pdf/2108.04539.pdf].
Appalaraju et al., "DocFormer: End-to-End Transformer for Document Understanding," arXiv (CoRR), Sep. 20, 2021, 22 pages. [retrieved from: https://arxiv.org/pdf/2106.11539.pdf].
International Searching Authority, "International Preliminary Report on Patentability," issued in connection with International Patent Application No. PCT/IB2019/000299, mailed on Sep. 28, 2021, 5 pages.
Li et al. "StrucTexT: Structured Text Understanding with Multi-Modal Transformers", in ACM International Conference on Multimedia (ACM Multimedia), pp. 1912-1920. 2021.
United States Patent and Trademark Office, "Final Office Action," issued in connection with U.S. Appl. No. 16/692,797, dated Oct. 27, 2021, 14 pages.
International Searching Authority, "Written Opinion," issued in connection with International Patent Application No. PCT/US2021/039931, mailed on Nov. 4, 2021, 4 pages.
International Searching Authority, "International Search Report," issued in connection with International Patent Application No. PCT/US2021/039931, mailed on Nov. 4, 2021, 3 pages.
European Patent Office, "Communication pursuant to Rules 161(2) and 162 EPC," in connection with European Patent Application No. 19921870.2, issued Nov. 5, 2021, 3 pages.
Zhang et al., "Entity Relation Extraction as Dependency Parsing in Visually Rich Documents," Empirical Methods in Natural Language Processing (EMNLP), Nov. 7, 2021, 10 pages.
Hwang et al., "Cost-Effective End-to-end Information Extraction for Semi-structured Document Images," Empirical Methods in Natural Language Processing (EMNLP), Nov. 7, 2021, 9 pages.
Gu et al., "UniDoc: Unified Pretraining Framework for Document Understanding," Neural Information Processing Systems (NeurIPS), Dec. 6, 2021, 12 pages.
Park et al. "CORD: A Consolidated Receipt Dataset for Post-OCR Parsing. In Workshop on Document Intelligence," at NeurIPS 2019, 4 pages.
Wang et al. "LiLT: A Simple yet Effective Language-Independent Layout Transformer for Structured Document Understanding", in Annual Meeting of the Association for Computational Linguistics (ACL), 2022, 11 pages.
United States Patent and Trademark Office, "Advisory Action," issued inconnection with U.S. Appl. No. 16/692,797, dated Feb. 16, 2022, 4 pages.
Github, "Doccano tool," Github.com, downloaded on Apr. 1, 2022, 12 pages. [retrieved from:https://github.com/doccano/doccano].
Datasetlist, "Labeling tools—List of labeling tools," Datasetlist.com, updated Dec. 2021, downloaded on Apr. 1, 2022, 14 pages. [retrieved from: https://www.datasetlist.com/tools/].
Levenshtein, "Binary Codes Capable of Correcting Deletions, Insertions, and Reversals," Soviet Physics—Doklady, Cybernetics and Control Theory, pp. 707-710, vol. 10, No. 8, Feb. 1966,4 pages.
Smith et al., "Identification of Common Molecular Subsequences," Reprinted Journal of Molecular Biology, Academic Press Inc. (London) Ltd., pp. 195-197, dated 1981, 3 pages.
Govindan et al., "Character Recognition—A Review," Pattern Recognition, vol. 23, No. 7, pp. 671-683, published Jul. 20, 1990, 13 pages.
Poulovassilis et al. "A nested-graph model for the representation and manipulation of complex objects." ACM Trans. Inf. Syst. 12 (1994): 34 pages.
Hochreiter et al. "Long Short-Term Memory." Neural Computation 9 (1997): 1735-1780, 46 pages.
Ng et al., "On Spectral Clustering: Analysis and an Algorithm," NIPS'01: Proceedings of the 14th International Conference on Neural Information Processing Systems: Natural and Synthetic, Jan. 2001, 8 pages.
Crandall et al., "Extraction of special effects caption text events from digital video," IJDAR, Department of Computer Science and Engineering, The Pennsylvania State University, 202 Pond Laboratory, University Park, PA, accepted Sep. 13, 2022, pp. 138-157, 20 pages.
Lowe, "Distinctive Image Features from Scale-Invariant Key points," International Journal of Computer Vision (HCV), published Jan. 5, 2004, 20 pages.
Marinai, "Introduction to Document Analysis and Recognition," Machine Learning in Document Analysis and Recognition, published 2008, 20 pages.
Vogel et al., "Parallel Implementations of Word Alignment Tool," Software Engineering, Testing, and Quality Assurance for Natural Language Processing, nn. 49-57, Jun. 2008, 10 pages.
O'Gorman et al., "Document Image Analysis," IEEE Computer Society Executive Briefings, dated 2009, 125 pages.
Oliveira et al., "A New Method for Text-Line Segmentation for Warped Documents," International Conference Image Analysis and Recognition, Jun. 21, 2010, 11 pages.
Krizhevsky et al., "ImageNet Classification with Deep Convolutional Neural Networks," In International Conference on Neural Information Processing Systems (NIPS), published 2012, 9 pages.
Chung et al. "Empirical Evaluation of Gated Recurrent Neural Networks on Sequence Modeling," ArXiv abs/1412.3555, dated 2014, 9 pages.
Nshuti, "Mobile Scanner and OCR (A First Step Towards Receipt to Spreadsheet)," published 2015, 3 pages.
Ronneberger et al., "U-Net: Convolutional Networks for Biomedical Image Segmentation," Medical Image Computing and Computer-Assisted Intervention (MICCAI), dated May 18, 2015, 8 pages.
Lecun et al., "Deep Learning," Nature, vol. 521, pp. 436-444, dated May 28, 2015, 9 pages.
Genereux et al., "NLP Challenges in Dealing with OCR-ed Documents of Derogated Quality," Workshop on Replicability and Reproducibility in Natural Language Processing, IJCAI 2015, dated Jul. 2015, 6 pages.
Ren et al., "Faster R-CNN: Towards Real-Time Object Detection with Region Proposal Networks," In International Conference on Neural Information Processing Systems (NIPS), pp. 91-99, dated Dec. 7, 2015, 14 pages.
Kim et al., "Character-Aware Neural Language Models," Proceedings of the Thirtieth AAAI Conference on Artificial Intelligence (AAAI'IO), pp. 2741-2749, 2016, 9 pages.
Redmon et al., "You Only Look Once: Unified, Real-Time Object Detection," In Conference on Computer Vision and Pattern Recognition (CVPR), dated May 9, 2016, 10 pages.

(56) References Cited

OTHER PUBLICATIONS

Osindero et al., "Recursive Recurrent Nets with Attention Modeling for OCR in the Wild," in Conference on Computer Vision and Pattern Recognition (CVPR), dated Jun. 27, 2016, 10 pages.

Joulin et al., "Bag of Tricks for Efficient Text Classification," In Proceedings of the 15th Conference of the European Chapter of the Association for Computational Linguistics, dated Aug. 9, 2016, 5 pages.

Konda et al., "Magellan: Toward Building Entity Matching Management Systems Over Data Science Stacks," Proceedings of the VLDB Endowment, vol. 9, No. 13, pp. 1581-1584, dated 2016, 4 pages.

Kipf et al., "Semi-Supervised Classification with Graph Convolutional Networks," 5th International Conference on Learning Representations, Apr. 24, 2017, 14 Pages.

Bojanowski et al., "Enriching Word Vectors with Subword Information," In Journal Transactions of the Association for Computational Linwstics, 2017, vol. 5, pp. 135-146, dated Jun. 2017, 12 pages.

Vaswani et al., "Attention is all you need," In Advances in Neural Information Processing Systems,31st Conference on Neural Information Processing Systems (NIPS 2017), Long Beach, CA, last revised Dec. 6, 2017, 15 pages.

Hui, "mAP (mean Average Precision) for Object Detection," Mar. 6, 2018, 2 pages. Retrieved from [https://medium.eom/@jonathan hui/map-mean-average-precision-for-object-detection-45cl21a311731 on May 11, 2020, 2 pages.

Velickovic et al. "Graph Attention Networks," ArXiv abs/1710. 10903, 2018, 12 pages.

Mudgal et al., "Deep learning for entity matching: A design space exploration," in Proceedings of the 2018 International Conference on Management of Data, dated Jun. 10-15, 2018, 16 pages.

Wick et al., "Calamari—A High-Performance Tensorflow-based Deep Learning Package for Optical Character Recognition," Digital Humanities Quarterly, Jul. 5, 2018, 12 pages. [retrieved from: https://arxiv.org/ftp/arxiv/papers/1807/1807.02004.pdf].

Akbik et al., "Contextual String Embeddings for Sequence Labeling," In Proceedings of the 27th International Conference on Computational Linguistics (COLING), dated Aug. 2018, 12 pages.

Ray et al., "U-PC: Unsupervised Planogram Compliance," in European Conference on Computer Vision (ECCV), 2018, 15 pages. [retrieved from:http://openaccess.thecvf.com/content_ECCV_2018/papers/ Archan_Ray_ U-PC_Unsupervised Planogram ECCV 2018 paper.pdf].

Follmann et al., "MVTec D2S: Densely Segmented Supermarket Dataset," In European Conference on Computer Vision (ECCV), dated 2018, 17 pages.

Li et al., "Extracting Figures and Captions from Scientific Publications," Short Paper, CIKM18, Oct. 22-26, 2018, Torino, Italy, 4 pages.

Elfwing et al. "Sigmoid-Weighted Linear Units for Neural Network Function Approximation in Reinforcement Learning," Neural Networks: Journal of the International Neural Network Society, vol. 107, Nov. 2018, 18 pages.

Huang et al., "Mask R-CNN with Pyramid Attention Network for Scene Text Detection", arXiv:1811.09058v1, pp. 1-9, https://arxiv.org/abs/1811.09058, Nov. 22, 2018, 9 pages.

Wikipedia, "Precision & Recall," Dec. 17, 2018 revision, 12 pages.

Artificial Intelligence & Image Analysis, "Intelligent Automation Eliminates Manual Data Entry From Complex Documents," White Paper, accessed on Jan. 30, 2019, 3 pages.

Artificial Intelligence & Image Analysis, "Historic Document Conversion," Industry Paper, accessed on Jan. 30, 2019, 4 pages.

Loshchilov et al., "Decoupled Weight Decay Regularization," 2019 International Conference on Learning Representations, May 6, 2019, 19 pages.

Nathancy, "How do I make masks to set all of image background, except the text, to white?", stakoverflow.com, https://stackoverflow.com/questions/56465359/how-do-i-make-masks-to-set-all-of-image-background-except-the-text-to-white, Jun. 5, 2019, 5 pages.

Devlin et al., "BERT: Pre-training of Deep Bidirectional Transformers for Language Understanding," In Conference of the North American Chapter of the Association for ComputationalLinguistics (NAACL-HLT), dated Jun. 24, 2019, 16 pages.

Qasim et al., "Rethinking Table Recognition using Graph Neural Networks," In Inernational Conference on Document Analysis and Recognition (ICDAR), dated Jul. 3, 2019, 6 pages.

Feng et al., "Computer vision algorithms and hardware implementations: A survey," Integration: the VLSI Journal, vol. 69, pp. 309-320, dated Jul. 27, 2019, 12 pages.

Hu et al., "Semi-supervised Node Classification via Hierarchical Graph Convolutional Networks." ArXiv abs/1902.06667, 2019, 8 Pages.

Oliveira et al., "dhSegment: A generic deep-learning approach for document segmentation," In 16th International Conference on Frontiers in Handwriting Recognition (ICFHR), dated Aug. 14, 2019, 6 pages.

Zhong et al., "PubLayNet: largest dataset ever for document layout analysis," In International Conference on Document Analysis and Recognition (ICDAR), dated Aug. 16, 2019, 8 pages.

Guillaume et al., "FUNSD: A Dataset for Form Understanding in Noisy Scanned Documents," International Conference on Document Analysis and Recognition (ICDAR), Sep. 20, 2019, 6 pages.

Leicester et al., "Using Scanner Technology to Collect Expenditure Data," Fiscal Studies, vol. 30, Issue 3-4, 2009, 29 pages.

United States and Patent and Trademark Office, "Non-Final Office Action," issued in connection with U.S. Appl. No. 17/566,135, dated Mar. 27, 2024, 13 pages.

United States Patent and Trademark Office, "Non-Final Office Action," issued in connection with U.S. Appl. No. 18/476,978, dated Apr. 18, 2024, 20 pages.

United States Patent and Trademark Office, "Notice of Allowance and Fee(s) Due," issued in connection with U.S. Appl. No. 17/710,538, dated Apr. 19, 2024, 8 pages.

United States Patent and Trademark Office, "Non-Final Office Action," issued in connection with U.S. Appl. No. 17/710,660, on May 28, 2024, 9 pages.

Canadian Intellectual Property Office, "Office Action," issued in connection with Canadian Patent Application No. 3,182,471, dated May 28, 2024, 5 pages.

Visich, "Bar Codes and Their Applications," Research Foundation of State University of New York, 1990, 59 pages.

European Patent Office, "Communication pursuant to Article 94(3) EPC," issued in connection with European Patent Application No. 19 921 870.2-1207, on Apr. 9, 2024, 7 pages.

United States Patent and Trademark Office, "Supplemental Notice of Allowability," issued in connection with U.S. Appl. No. 17/710,538, dated May 8, 2024, 3 pages.

United States Patent and Trademark Office, "Final Office Action," issued in connection with U.S. Appl. No. 17/566,135, dated Jul. 25, 2024, 17 pages.

United States Patent and Trademark Office, "Notice of Allowance and Fee(s) Due," issued in connection with U.S. Appl. No. 18/191,642, dated Aug. 28, 2024, 7 pages.

United States Patent and Trademark Office, "Final Office Action," issued in connection with U.S. Appl. No. 18/476,978, dated Aug. 14, 2024, 22 pages.

United States Patent and Trademark Office, "Notice of Allowance and Fee(s) Due," issued in connection with U.S. Appl. No. 17/710,538, dated Aug. 14, 2024, 8 pages.

United States Patent and Trademark Office, "Non-Final Office Action," issued in connection with U.S. Appl. No. 17/710,649, dated Sep. 16, 2024, 12 pages.

United States Patent and Trademark Office, "Notice of Allowance and Fee(s) Due," issued in connection with U.S. Appl. No. 17/710,660 dated Sep. 25, 2024, 9 pages.

International Searching Authority, "International Preliminary Report on Patentability," issued in connection with International Application No. PCT/US2023/011859, mailed on Aug. 6, 2024, 6 pages.

United States Patent and Trademark Office, "Supplemental Notice of Allowability," issued in connection with U.S. Appl. No. 17/710,538, dated Sep. 11, 2024, 3 pages.

(56) References Cited

OTHER PUBLICATIONS

United States Patent and Trademark Office, "Advisory Action," issued in connection with U.S. Appl. No. 18/476,978, dated Oct. 7, 2024, 3 pages.

United States Patent and Trademark Office, "Notice of Allowance and Fee(s) Due," issued in connection with U.S. Patent Application No. 17/566,135, dated Oct. 11, 2024, 9 pages.

* cited by examiner

6 Mushroom
with Croutons

Soup in a cup

Ingredients: Dried Glucose Syrup, Cornflour, Palm Oil, Potato Starch, Croutons (11%) (Fortified Wheat Flour) (Wheat Flour, Calcium carbonate, Iron, Niacin, Thiamin) Palm Oil, Salt, Yeast.) Maltodextrin, Flavourings (contain Milk), Dried Mushroom (3%), Salt, Sugar, Mushroom Extract Powder, Milk Protein, Stabilisers (Dipotassium phosphate, Trisodium citrate), Onion Powder, Dried Parsley, Caramelised Sugar Powder,

Allergy Advice: For allergens, including cereals containing gluten, see ingredients in bold.

Origin: Made in UK for Co-operative Group Ltd. Manchester M60-0AG. www.co-operativefood.co.uk

| Nutrition Typical values (made up as directed) | per 100ml (made up as directed) | per sachet (made up as directed) (approx. 226ml) | Reference Intake | |
|---|---|---|---|---|
| | | | Average adult | per serving |
| Energy value | 290kJ | 650kJ | 8400kJ | 8% |
| (kcal | 70kcal | 155kcal) | 2000kcal | |
| Fat | 3.0g | 6.8g Low | 70g | 10% |
| (of which Saturates | 1.5g | 3.4g) Low | 20g | 17% |
| Carbohydrate | 9.5g | 21.5g | 260g | 9% |
| (of which Sugars | 1.3g | 2.9g) Low | 90g | 3% |
| Fibre | 0.5g | 1.1g | | |
| Protein | 0.7g | 1.6g | 50g | 4% |
| Salt | 0.5g | 1.1g Med | 6g | 19% |
| Reference intake of an average adult (8400kJ/2000kcal) | | | | |
| 6 servings | | | | |

FIG. 4A

6 Mushroom
with Croutons

Soup in a cup

Ingredients Dried Glucose Syrup, Cornflour, Palm Oil, Potato Starch, Croutons (11%) (Fortified Wheat Flour) (Wheat Flour, Calcium carbonate, Iron, Niacin, Thiamin) Palm Oil, Salt, Yeast.) Maltodextrin, Flavourings (contain Milk), Dried Mushroom (3%), Salt, Sugar, Mushroom Extract Powder, Milk Protein, Stabilisers (Dipotassium phosphate, Trisodium citrate), Onion Powder, Dried Parsley, Caramelised Sugar Powder,

Allergy Advice For allergens, including cereals containing gluten, see ingredients in bold.

Origin Made in UK for Co-operative Group Ltd. Manchester M60-0AG. www.co-operativefood.co.uk

| Nutrition Typical values (made up as directed) | per 100ml (made up as directed) | per sachet (made up as directed) (approx. 226ml) | Reference Intake Average adult | per serving |
|---|---|---|---|---|
| Energy value | 290kJ | 650kJ | 8400kJ | 8% |
| (kcal | 70kcal | 155kcal) | 2000kcal | |
| Fat | 3.0g | 6.8g  Low | 70g | 10% |
| (of which Saturates | 1.5g | 3.4g  Low | 20g | 17% |
| Carbohydrate | 9.5g | 21.5g | 260g | 9% |
| (of which Sugars | 1.3g | 2.9g  Low | 90g | 3% |
| Fibre | 0.5g | 1.1g | | |
| Protein | 0.7g | 1.6g | 50g | 4% |
| Salt | 0.5g | 1.1g  Med | 6g | 19% |
| Reference intake of an average adult (8400kJ/2000kcal) | | | | |
| 6 servings | | | | |

FIG. 4D

6 Mushroom
with Croutons

Soup in a cup

Ingredients
Dried Glucose Syrup, Cornflour, Palm Oil, Potato Starch, Croutons (11%) (Fortified Wheat Flour) (Wheat Flour, Calcium carbonate, Iron, Niacin, Thiamin) Palm Oil, Salt, Yeast.) Maltodextrin, Flavourings (contain Milk), Dried Mushroom (3%), Salt, Sugar, Mushroom Extract Powder, Milk Protein, Stabilisers (Dipotassium phosphate, Trisodium citrate), Onion Powder, Dried Parsley, Caramelised Sugar Powder,

Allergy Advice For allergens, including cereals containing gluten, see ingredients in bold.

Origin Made in UK for Co-operative Group Ltd. Manchester M60-0AG. www.co-operativefood.co.uk

| Nutrition Typical values (made up as directed) | per 100ml (made up as directed) | per sachet (made up as directed) (approx. 226ml) | | Reference Intake Average adult | per serving |
|---|---|---|---|---|---|
| Energy value | 290kJ | 650kJ | | 8400kJ | 8% |
| (kcal | 70kcal | 155kcal) | | 2000kcal | |
| Fat | 3.0g | 6.8g | Low | 70g | 10% |
| (of which Saturates | 1.5g | 3.4g) | Low | 20g | 17% |
| Carbohydrate | 9.5g | 21.5g | | 260g | 9% |
| (of which Sugars | 1.3g | 2.9g) | Low | 90g | 3% |
| Fibre | 0.5g | 1.1g | | | |
| Protein | 0.7g | 1.6g | | 50g | 4% |
| Salt | 0.5g | 1.1g | Med | 6g | 19% |
| Reference intake of an average adult (8400kJ/2000kcal) | | | | | |
| 6 servings | | | | | |

FIG. 5A

6 Mushroom
with Croutons

Soup in a cup

Ingredients
Dried Glucose Syrup, Cornflour, Palm Oil, Potato Starch, Croutons (11%) (Fortified Wheat Flour) (Wheat Flour, Calcium carbonate, Iron, Niacin, Thiamin) Palm Oil, Salt, Yeast.) Maltodextrin, Flavourings (contain Milk), Dried Mushroom (3%), Salt, Sugar, Mushroom Extract Powder, Milk Protein, Stabilisers (Dipotassium phosphate, Trisodium citrate), Onion Powder, Dried Parsley, Caramelised Sugar Powder,

Allergy Advice For allergens, including cereals containing gluten, see ingredients in bold.

Origin Made in UK for Co-operative Group Ltd. Manchester M60-0AG. www.co-operativefood.co.uk

| Nutrition Typical values (made up as directed) | per 100ml (made up as directed) | per sachet (made up as directed) (approx. 226ml) | | Reference Intake Average adult | per serving |
|---|---|---|---|---|---|
| Energy value | 290kJ | 650kJ | | 8400kJ | 8% |
| (kcal) | 70kcal | 155kcal) | | 2000kcal | |
| Fat | 3.0g | 6.8g | Low | 70g | 10% |
| (of which Saturates) | 1.5g | 3.4g) | Low | 20g | 17% |
| Carbohydrate | 9.5g | 21.5g | | 260g | 9% |
| (of which Sugars) | 1.3g | 2.9g) | Low | 90g | 3% |
| Fibre | 0.5g | 1.1g | | | |
| Protein | 0.7g | 1.6g | | 50g | 4% |
| Salt | 0.5g | 1.1g | Med | 6g | 19% |
| Reference intake of an average adult (8400kJ/2000kcal) | | | | | |
| 6 servings | | | | | |

FIG. 5D

806 — INFLAMMABLE: UTILISER A L'ECART DE TOUTE FLAMME, SOURCE D'ETINCELLES, D'IGNITION OU CORPS INCANDESCENT EVITAR. DE VAPORISER SUR UNE PEAU IRRITEE OUVERS LES YEUX; EN CAS DE PRJECTION RINCER IMMEDIATEMENT ET ABONDAMENT AVEC DE L'EAU.

FLAMMABLE: DO NOT SPRAY ON A NAKED FLAME OR ANY INCANDESCENT MATERIAL, KEEP AWAY FROM FLAMES, SPARKS, AND SOURCES OF IGNITION. AVOID SPRAYING TOWARDS THE EYES OR ON INFLAMED SKIN IN CASE OF CONTACT RINSE IMMEDIATELY WITH PLENTY OF WATER.

INFAMABLE: UTILIZAR ALEEIJADO DE CUALQEURE LAMMA, FUENTE DE CHISPAS, DE IGNICIÓN O CUERPO INCANDESCENTE EVITAR VAPORIZAR SOBRE UNA PIEL IRRADA O HACIA LOS OJOS EN CASO DE PROYECCIÓN ACLARAR INMEDIATAMENTE Y ABUNDANTEMENTE CON AGUA.

804 — zelfs fdragen in de zon. Roger&Gallet werkt sirids jaar en dag samen met de beste designers van zijn tijd en creerde voor u een zuiver beijnde flacon, getekend Martin Szekly 801 — 8/5709.02INGREDIENTS: ALCOHOL, 0.91 AGUA/WATER, PARRUM/FRAGRANCE. BUTYL METHOXYENBENZOYLMETHANE, ETHYLHEXYL METHOXYCINNAMATE, PROPYLENE GLYCOL, GERNAIOL, UNALOOL, LIMONENE, CITRAL, CITRONELLOL, ZINGIBER OFFICINAL (GINGER) ROOT EXTRACT, TARNESOL. CI14700/RED4 CI19140/YELLOW 5 (F.I.1 8477921)

802 — INFLAMÁVEL: UTILIZAR AFASTADO DE QUALQUIER CHAMA, FONTE DE FAISCA DE IGNICAO OU CORPO INCANDESCENTE, ENVITAR VAPORIZAR PARA OS OLHOS OU SOBRE PELE IRRITADA. EM CASO DE PROJECÇÃO. LAVAR IMEDIATA E ABUNDANTEMENTE COM ÁGUA.

ENTIZÚNDUCH: VON FLAMMEN, ZUNDQUELLEN ODER GLÜHENDEN GEGENSTANDEN FERNHAUTEN NICHT AUF IRRITERTE HAUT ODER IN DIE AUGEN SPRÜHEN, BEI KNTAKT SOFORT MITWASSER GRÜNDUCH AUSSPULEN.

ONTVLAVBAAR NIET SPUTTEN IN DE RICHTING VAN EEN VLAM OF GLOEIND VOORWERP, VERWILDERD HOUDENVAN ONISTEKNGSERONNEN VERMUD VERSTUVEN RICHTING DE OGEN OF OP GEIRITEEDE HUID, IN GEVAL VAN CONTACT ONMIDOELLUK MET VEEL WATER SPOLLEN

FIG. 8

METHODS AND APPARATUS TO DETECT A TEXT REGION OF INTEREST IN A DIGITAL IMAGE USING MACHINE-BASED ANALYSIS

FIELD OF THE DISCLOSURE

This disclosure relates generally to computing systems, and, more particularly, to methods and apparatus to detect a text region of interest in a digital image using machine-based analysis.

BACKGROUND

Image recognition involves computer-aided techniques to analyze pictures or photographs to determine and/or identify the content of the captured scene (e.g., the recognition of the general subject matter of the scene and/or the recognition of individual objects within the scene). Such techniques are useful in different applications across different industries. For example, retail establishments, product manufacturers, and other business establishments may take advantage of image recognition techniques of photographs of such establishments (e.g., pictures of product shelving) to identify quantities and/or types of products in inventory, to identify shelves that need to be restocked and/or the frequency with which products need restocking, to recognize and read product barcodes or textual information about the product, to assess product arrangements and displays, etc.

BRIEF DESCRIPTION OF THE DRAWINGS

FIGS. 4A-4D depict an example image as it is processed using examples disclosed herein to generate an example text-map and determine a location of an example text region of interest.

FIG. 5A-5D depict the example image of FIGS. 4A-4D in association with another example text-map and another example text region of interest.

FIG. 8 depicts example images including a text region of interest identified by the CNN of FIGS. 1, 2, 6, and 7 based on teachings of this disclosure.

The figures are not to scale. In general, the same reference numbers will be used throughout the drawing(s) and accompanying written description to refer to the same or like parts.

Figure 1:
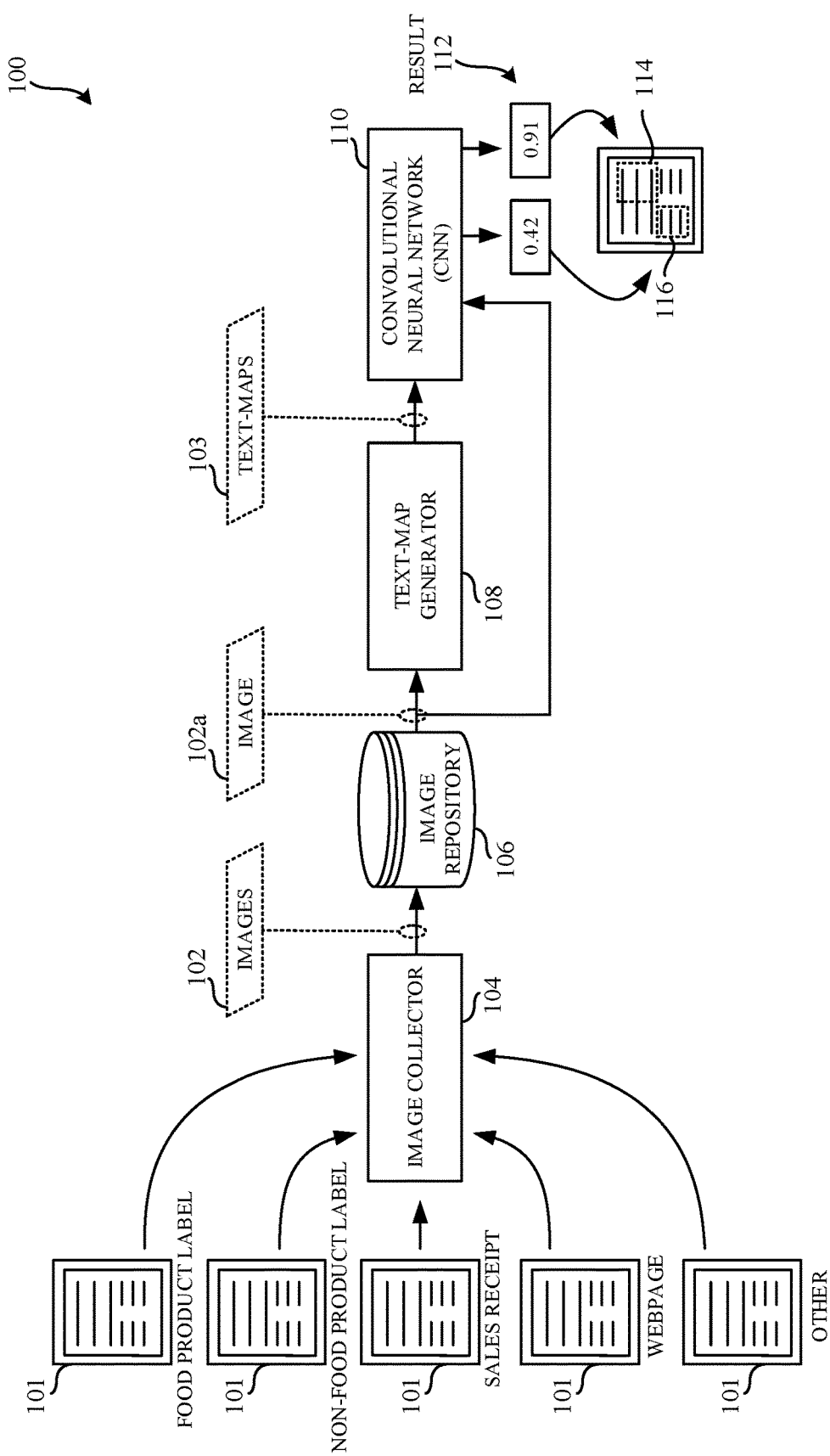
FIG. 1 is an example image collection and analysis system including an example text-map generator and an example convolutional neural network (CNN) to locate text regions of interest in images.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Examples disclosed herein employ computer vision and machine-based deep learning to detect context in which text is located (e.g., a text region of interest) in images. To identify locations of text regions of interest based on context of text, examples disclosed herein employ a CNN that is trained based on deep learning techniques to discern between different contexts in which text appears in an image. A CNN is a deep learning network relying on previously analyzed (e.g., trained) images to analyze new images. For example, if an element of interest to be analyzed and/or detected is a product logo, a CNN may be trained using a plurality of images including the product logo to understand the significant elements of the logo (e.g., the shape, color, etc.) so that the CNN can detect, with a certain probability, that the logo appears in an image. CNNs typically perform such analysis using a pixel-by-pixel comparison algorithm. For example, a CNN may perform such analysis by extracting visual features from the image. However, text recognition performance of CNNs is substantially lower than their visual feature recognition performance due to the similarity of the visual features of text across different regions. To overcome the poor text recognition performance of CNNs and leverage their strengths in visual feature recognition performance, examples disclosed herein pre-process text in images to generate color-coded text-map images in which different color shadings are used to generate color-coded visual depictions of locations of text in an image. These color-coded text-maps operate as proxies for corresponding text when CNNs analyze the color-coded text-map images based on visual feature analysis.

In examples disclosed herein, CNN-based deep learning is used to analyze images that include text-based information or descriptions and identify text regions of interest by discerning such text regions of interest from other text regions not of interest. Techniques disclosed herein are useful in many areas including analyzing images having high-densities of text that cannot be parsed, discerned, or identified based on text characteristics with a suitable accuracy by CNNs using prior techniques. In examples disclosed herein, color-coding or color-shading locations of text in text-maps facilitate visually perceiving high-density text in an image as, for example, paragraphs of text, tables of text, groupings of relatively small-sized fonts compared to an image as a whole, etc.

In some examples disclosed herein, a source image with different text regions is analyzed by generating text data from the source image, the source image including a first text region of interest and a second text region not of interest; generating a plurality of color-coded text-map images, the plurality of color-coded text-map images including color-coded segments with different colors, the color-coded segments corresponding to different text characteristics; and determining a first location in the source image as more likely to be the first text region of interest than a second location in the source image corresponding to the second text region that is not of interest based on performing a CNN analysis on the source image and the plurality of color-coded text-map images.

As used herein, a text characteristic is defined as an aspect or trait of text characters and/or words. For example, a text characteristic may be whether the text is punctuation, whether the text is numeric, whether the text appears more than a threshold number of times, whether the text matches a dictionary of known words, or any other suitable characteristic that can be measured. As used herein, text context or context of text is defined as the underlying setting that denotes the purpose or intent for which text appears on an image. For example, the text context or context of text may represent that text is in a text region to represent an ingredients list section on a food product label, that text is in a text region to represent a nutrition facts table on a food product label, that text is in a text region to identify artistic performers on an admissions ticket, that text is in a text region to represent a store address on a sales receipt, etc.

As used herein, a text region of interest is defined as a region of text in an image that corresponds to a text context or context of text specified in a user input as a query or request for locating in an input image. For example, a user may specify in a configuration file or in an input parameter that an image analysis process should identify a text region of interest as a location of an ingredients list or a location of a nutrition facts table in an image of a food product label. Alternatively, if an example image is a sales receipt, the text region of interest may be a location of a product price or a location of a store address. In yet another example, if the input image is a product webpage for an online retailer, the text region of interest may be a location of a department list or a location of a clearance section. In examples disclosed herein, a CCN discerns between a text region of interest and other text regions that are not of interest in an input image. As used herein, text regions not of interest are regions of text in an input image not commensurate with the text context or context of text identified in user input for locating in an input image.

In examples disclosed herein, separate color-coded text-maps are generated using separate colors corresponding to different measured text characteristics. In examples disclosed herein, images of the color-coded text-maps are provided as input to a CNN to identify text context or context of text, and locate text regions of interest in a subject image.

In examples disclosed herein, color-coded text-maps represent locations of text characters based on text characteristics. Example color-coded text-maps disclosed herein are visual representations in which color highlighting, color shading, or color chips are placed at locations corresponding to text characters and/or words using color values (e.g., red, green, blue, magenta, cyan, yellow, etc.) depending on the relevance of these text characters and/or words to the text characteristics corresponding to those colors. For example, extracted text of interest matching a predetermined set of words (e.g., a dictionary containing known words or phrases that are likely to be in the requested text context such as the keyword fiber in the text context of ingredients lists) may be colored and/or highlighted with a first color. In a similar example, extracted text of interest satisfying (e.g., greater than or equal to) a numerical threshold (e.g., numerical text less than 100) may be colored and/or highlighted with a second color. In yet another example, text or words appearing in an image a number of times satisfying (e.g., greater than or equal to) an occurrence ratio threshold or an occurrence threshold may be colored and/or highlighted with a third color. In examples disclosed herein, images of the color-coded text-maps are utilized as inputs to a CNN. In examples disclosed herein, the color-coding generated for a word or text is a color highlighting, color bar, color shading, or color chip that covers the footprint or area occupied by the corresponding word or text. In this manner, a text-map becomes a visually perceptive map of locations of words or text relative to one another within the boundary limits of an image.

FIG. 1 is an example image collection and analysis system 100 including an example text-map generator 108 and an example convolutional neural network (CNN) 110 to locate text regions of interest in images. The image collection and analysis system 100 of FIG. 1 further includes an example image collector 104 and an example image repository 106.

In the illustrated example of FIG. 1, the image 102 represents any suitable document including text characters, words, and/or text information such as a typed document, a photograph, a handwritten document, a PDF, etc. In examples disclosed herein, the images 102 may represent any text-containing item(s) of interest including an example food product label 101, an example non-food product label 101, an example sales receipt 101, an example webpage 101, or any other item 101. In examples disclosed herein, any of the food product label 101, non-food product label 101, sales receipt 101, webpage 101, or any other item 101 may hereinafter be referred to as example image 102.

In the example of FIG. 1, the image collector 104 obtains the images 102 to be analyzed. In examples disclosed herein, the image collector 104 may be any image capturing device used to capture the images 102 (e.g., a smartphone, a tablet, a computer, a camera, a scanner, a copy machine, etc.). The image collector 104 may capture and/or otherwise obtain one of the images 102 (e.g., the food product label 102), or any number of the images 102.

In the example of FIG. 1, the image repository 106 stores the images 102 obtained by the image collector 104. For example, the image repository 106 may store the images 102 in a hardware memory. The image repository 106 may be internal or external to the image collector 104. Alternatively, in some examples disclosed herein, the image repository 106 may be implemented as cloud storage external to the image collector 104 and, such cloud storage may be accessible via wired or wireless communication.

In the example of FIG. 1, the text-map generator 108 communicates with the image repository 106 to obtain one of the images 102. In FIG. 1, the obtained image is the food product label 102. In other examples disclosed herein, the obtained image may be any single one of, or plural ones of the images 102. The text-map generator 108 generates example text-maps 103 for use by the CNN 110. In examples disclosed herein, the text-maps 103 are color-coded text-map images that are visual representations of locations of text in the obtained image (e.g., the food product label 102). The operation of the text-map generator 108 will be explained in further detail in connection with FIG. 6 below.

In the example of FIG. 1, the CNN 110 communicates with the image repository 106 and the text map generator 108. The CNN 110 utilizes the text-maps 103 from the text-map generator in connection with the obtained image (e.g., the food product label 102) from the image repository 106 to generate an example result 112. The CNN 110 is a computer learning network that recognizes visual patterns in images. The CNN 110 may be implemented by any suitable neural network such as a region-convolutional neural network (RCNN), a fast region-convolutional neural network (Fast RCNN), etc.

In FIG. 1, the result 112 includes the text region of interest 114 and an example second region not of interest 116. In examples disclosed herein, the result 112 includes a set of probabilities including a probability representing the likelihood of the location of the text region of interest 114. In other examples disclosed herein, the result 112 includes a set of probabilities including a probability representing the likelihood of the location of the second region not of interest 116. In such an example, the second region not of interest 116 may have a corresponding probability and/or confidence score lower than the corresponding probability and/or confidence score associated with the text region of interest 114. In the example of FIG. 1, corresponding probability values (or confidence scores) of the text region of interest 114 and the second region not of interest 116 are shown as 0.91 and 0.42. For example, the confidence score of 0.91 corresponds to the text region of interest 114 and the confidence score of 0.42 corresponds to the second region not of interest 116. As such, the relatively higher confidence score of 0.91 indicates that the text region of interest 114 is more likely the text region of interest than the second region not of interest 116 corresponding to the relatively lower confidence score of 0.42.

Figure 2:
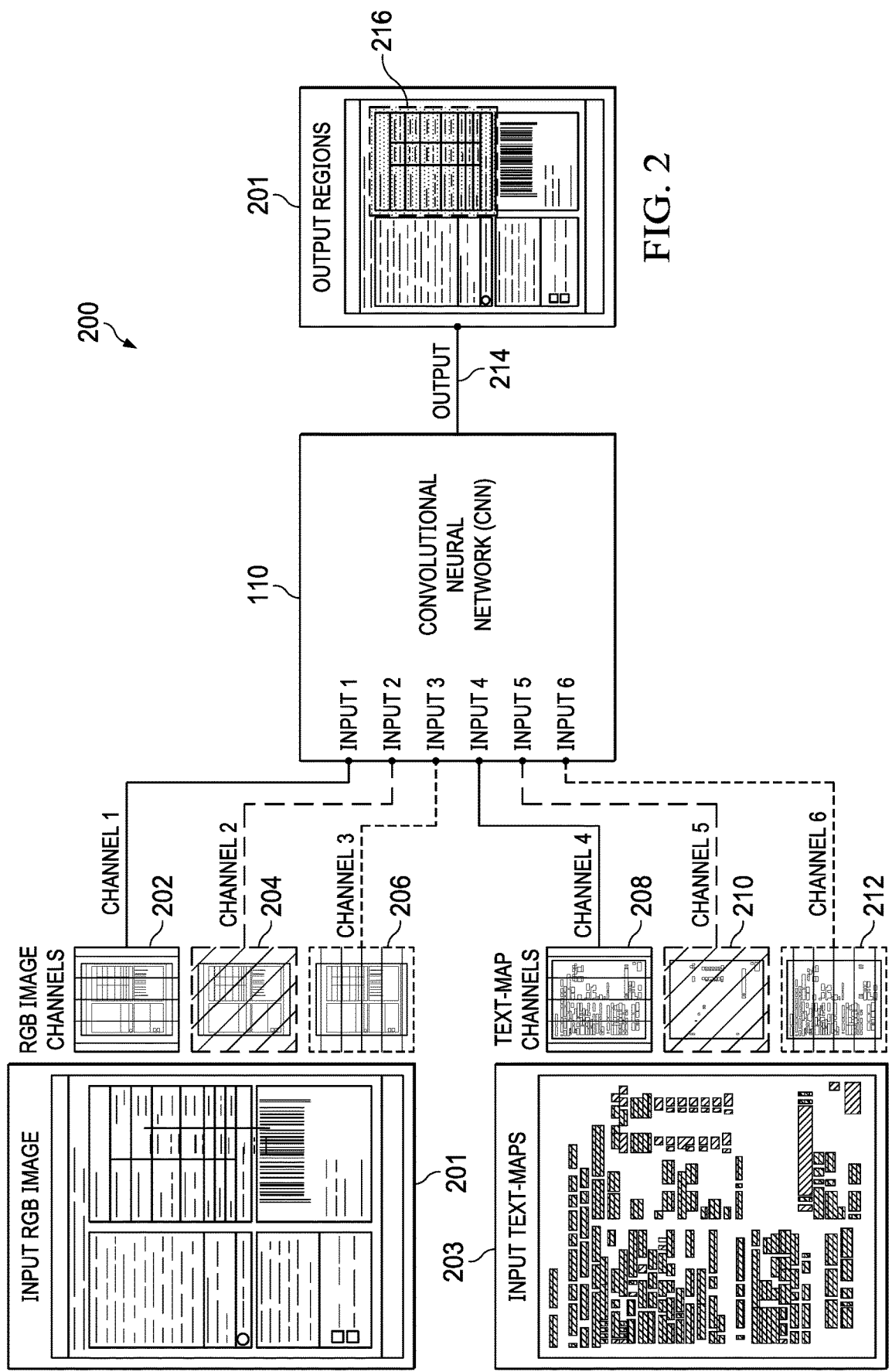
FIG. 2 is the example CNN of FIG. 1 structured to receive and analyze input images, and to determine locations of text regions of interest.

FIG. 2 is the example CNN 110 of FIG. 1 structured to receive and analyze input images, and to determine the locations of text regions of interest. An example implementation 200 of FIG. 2 includes an example nutritional image 201, example text-maps 203, and the CNN 110 of FIG. 1. The example CNN 110 includes a plurality of input channels including an example first input channel 202, an example second input channel 204, an example third input channel 206, an example fourth input channel 208, an example fifth input channel 210, and an example sixth input channel 212. The example CNN 110 also includes an example output channel 214. In other examples, the CNN 110 may include any number of input and/or output channels.

In the example of FIG. 2, after generating the text-maps 203 in accordance with teachings of this disclosure, the text-maps 203 are provided to the CNN 110. The example nutritional image 201 (e.g., the original image) is also provided to the CNN 110, and the CNN 110 analyzes the input images to detect an example text region of interest 216. In FIG. 2, the nutritional image 201 is separated into three color-component images of red, green, blue (RGB). The CNN 110 receives the nutritional image 201 as the three separate RGB color-component images using three RGB channels (e.g., the first input channel 202, the second input channel 204, and the third input channel 206). Also in the example of FIG. 2, the text-maps 203 include three color-component text-maps which are shown merely by way of example as overlaid on one another in FIG. 2. In implementation, the CNN 110 receives the text-maps 203 as the three separate color-component images using three text-map channels (e.g., the fourth input channel 208, the fifth input channel 210, and the sixth input channel 212). Each color-coded text-map provided to the text-map channels 208, 210, 212 highlights areas of text which satisfy respective text characteristics. Although three color-component channels are shown per input image in FIG. 2, fewer or more color-component channels may be used per input image in other examples. In addition, the colors of the text-map channels 208, 210, 212 need not be the same as the colors of the RGB channels.

The example CNN 110 is trained during a training phase to detect a particular type of text region of interest. Based on such training, the CNN 110 analyzes the color-coded-component inputs of the input images 201, 203 to detect features located therein, and generate probability outputs indicative of likelihoods that different corresponding text regions of the nutritional image 201 are a text region of interest. In the example of FIG. 2, in response to predicting the text region of interest 216 using the CNN 110, the implementation 200 may provide the text of the identified text region of interest (e.g., the ingredients list and/or nutritional facts) based on OCR text extraction.

Figure 3:
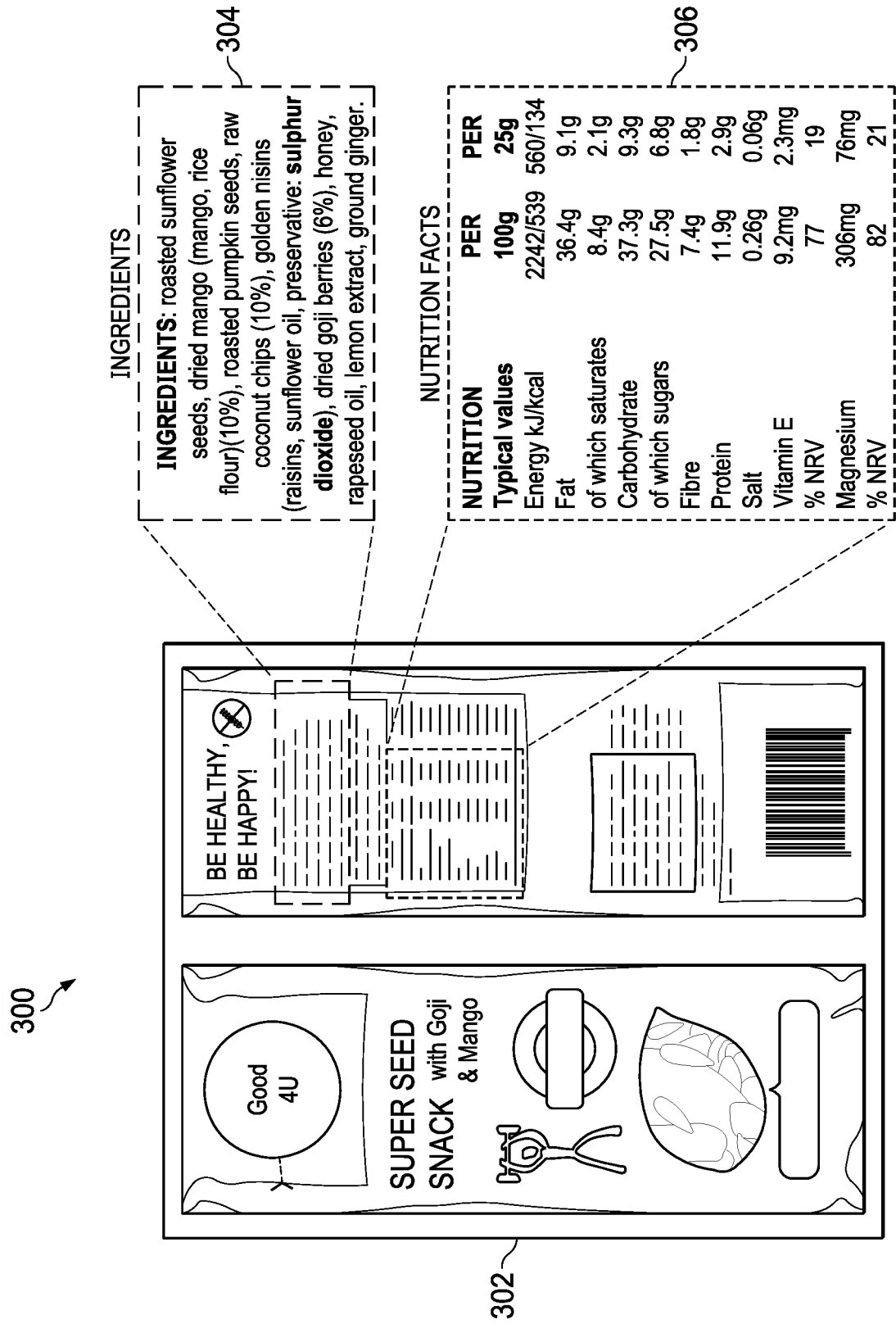
FIG. 3 is an illustration of an example image with multiple text regions to be analyzed by the CNN of FIG. 1.

FIG. 3 is an illustration 300 of an example image 302 with multiple text regions to be analyzed by the CNN 110 of FIG. 1 based on color-component images as described above in connection with FIG. 2. In FIG. 3, the image 302 is a product label including an example first text region of interest 304 and an example second text region of interest 306. In illustration, the image 302 includes multiple views of the product label mentioned above (e.g., a front view and a back view). In the example of FIG. 3, the first text region of interest 304 and the second text region of interest 306 are illustrative of example results from the CNN 110 of FIG. 1 (e.g., the result 112 of FIG. 1). The first text region of interest 304 corresponds to the identified region of text in which an ingredients list appears. The second text region of interest 306 corresponds to the identified region of text in which nutritional facts appear. In such an example, the text-map generator 108 (FIG. 1) and the CNN 110 are used to identify the location in which the context of the ingredients list appears (e.g., the first text region of interest 304) and the location in which the context of nutritional facts appears (e.g., the second text region of interest 306).

Figure 4B:
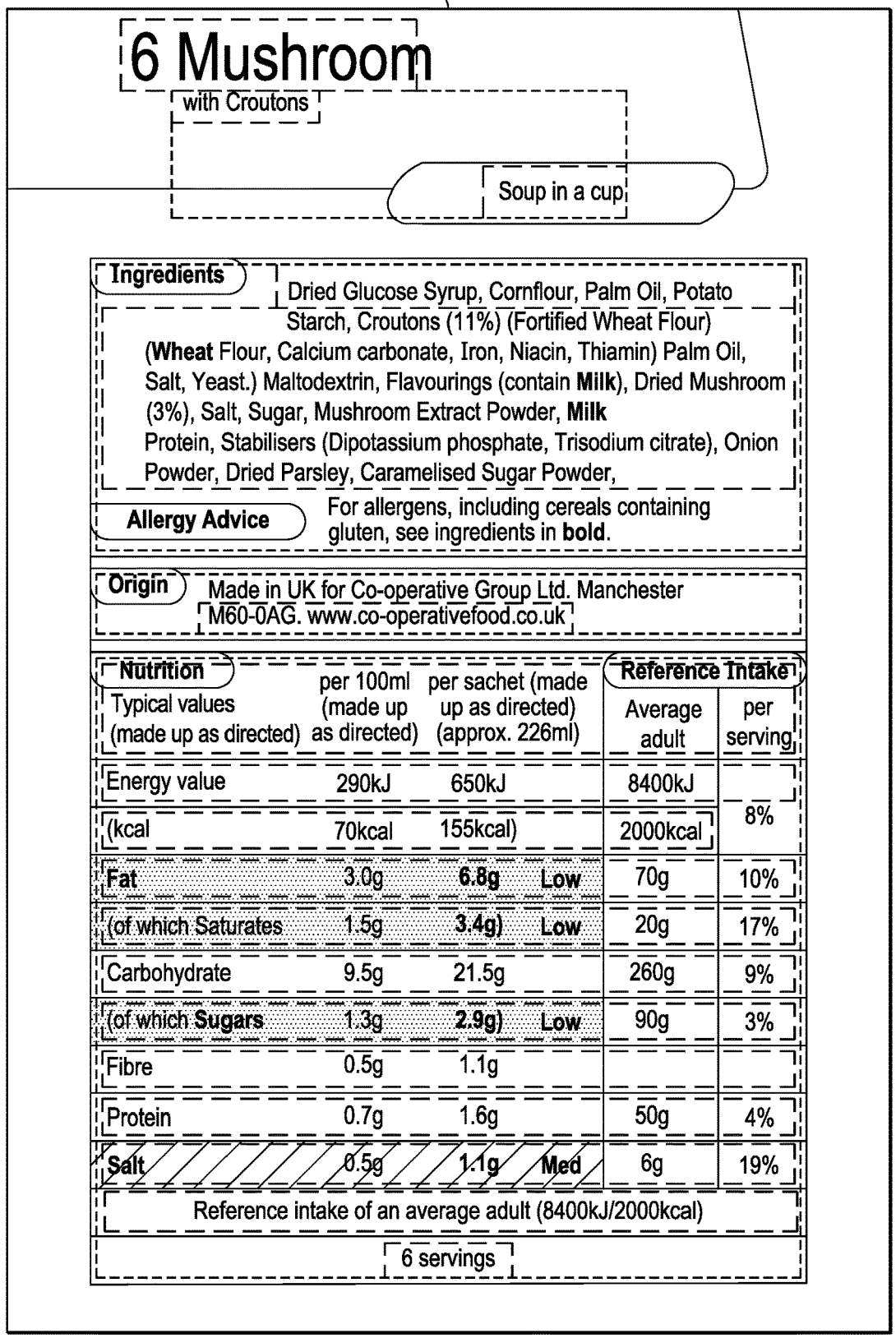
Figure 4C:
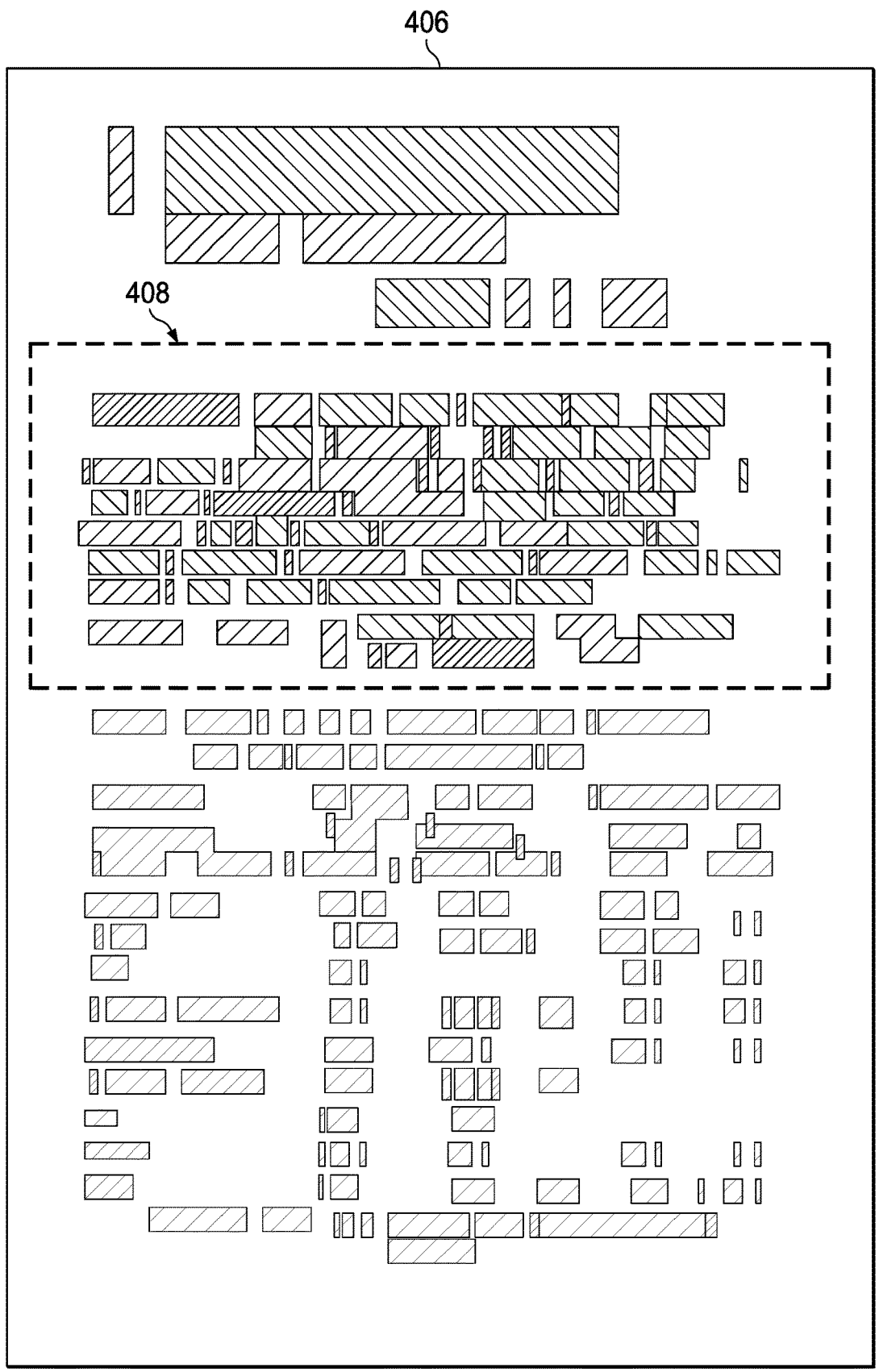

FIGS. 4A-4D depict an example image 402 as it is processed using examples disclosed herein to generate an example text-map 406 and determine a location of an example text region of interest 412. The examples of FIGS. 4A-4D show the image 402 at different stages of examples disclosed herein. For example, FIG. 4B is an example OCR-processed image of interest 404, FIG. 4C is the text-maps 406 including an example color-coded text region of interest 408, and FIG. 4D is an example result image 410 including a highlighting of the text region of interest 412.

In the example of FIGS. 4A-4D, the image 402 is a food product label including multiple contexts of text (e.g., an ingredients list, a nutrition facts table, a product description, etc.). The OCR-processed image of interest 404 (FIG. 4B) represents the resulting text extraction based on OCR analysis. In the OCR-processed image of interest 404, various text characters and/or words are identified for further analysis of the contexts in which the identified text characters and/or words are located.

In FIGS. 4A-4D, after the OCR analysis on the image 402 (e.g., the recognition of text in the OCR-processed image of interest 404), the text-maps 406 (FIG. 4C) are generated. In the example of FIGS. 4A-4D, the text-maps 406 are shown as an overlay of multiple color-coded text-maps (e.g., an overlay of a first color-coded text-map, a second color-coded text-map, and a third color-coded text-map) merely by way of example to show locations of different color-coded text locations relative to one another. For example, the word "milk" has a high probability of belonging to ingredients and, as such, the color-coded text region of interest 408 is colored in the text-map 406 with a relatively higher intensity than other words that are found in ingredients lists less often. In implementation, the text-maps 406 are separated and provided separately to the CNN 110, as described above in connection with FIG. 2. As such, the text-maps 406 are a visual representation including various colors corresponding to different text satisfying text characteristics corresponding to those color. In FIGS. 4A-4D, the color-coded text region of interest 408 corresponds to a desired context of text that includes an ingredients list.

In the example illustrated in FIG. 4D, the result image 410 includes a highlighted area identified by the CNN 110 as being the text region of interest 412. The text region of interest 412 represents the identified region and/or location corresponding to the intensely colored region in the text-map 406. In the example of FIGS. 4A-4D, the text region of interest 412 represents the detected ingredients list section.

Figure 5B:
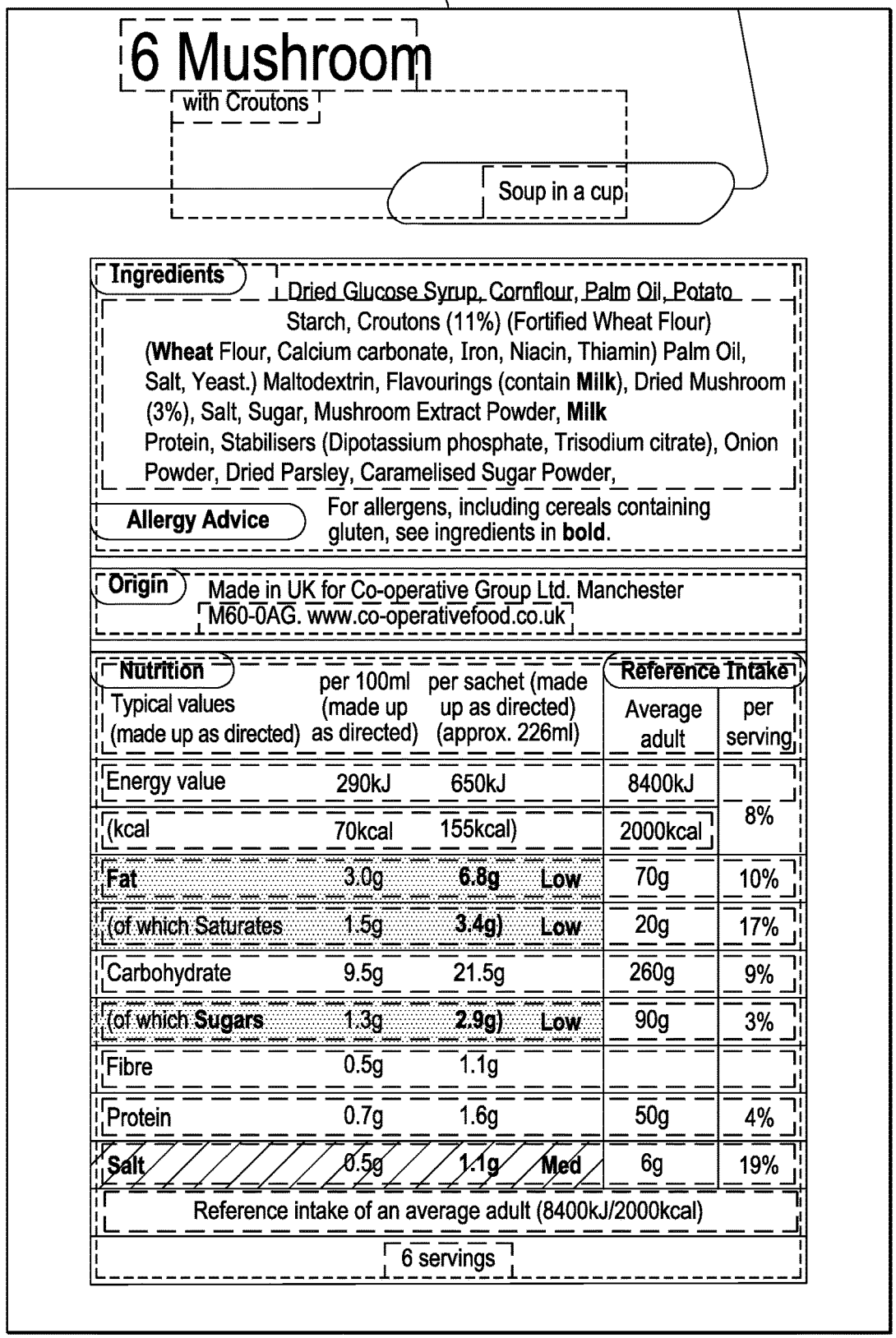
Figure 5C:
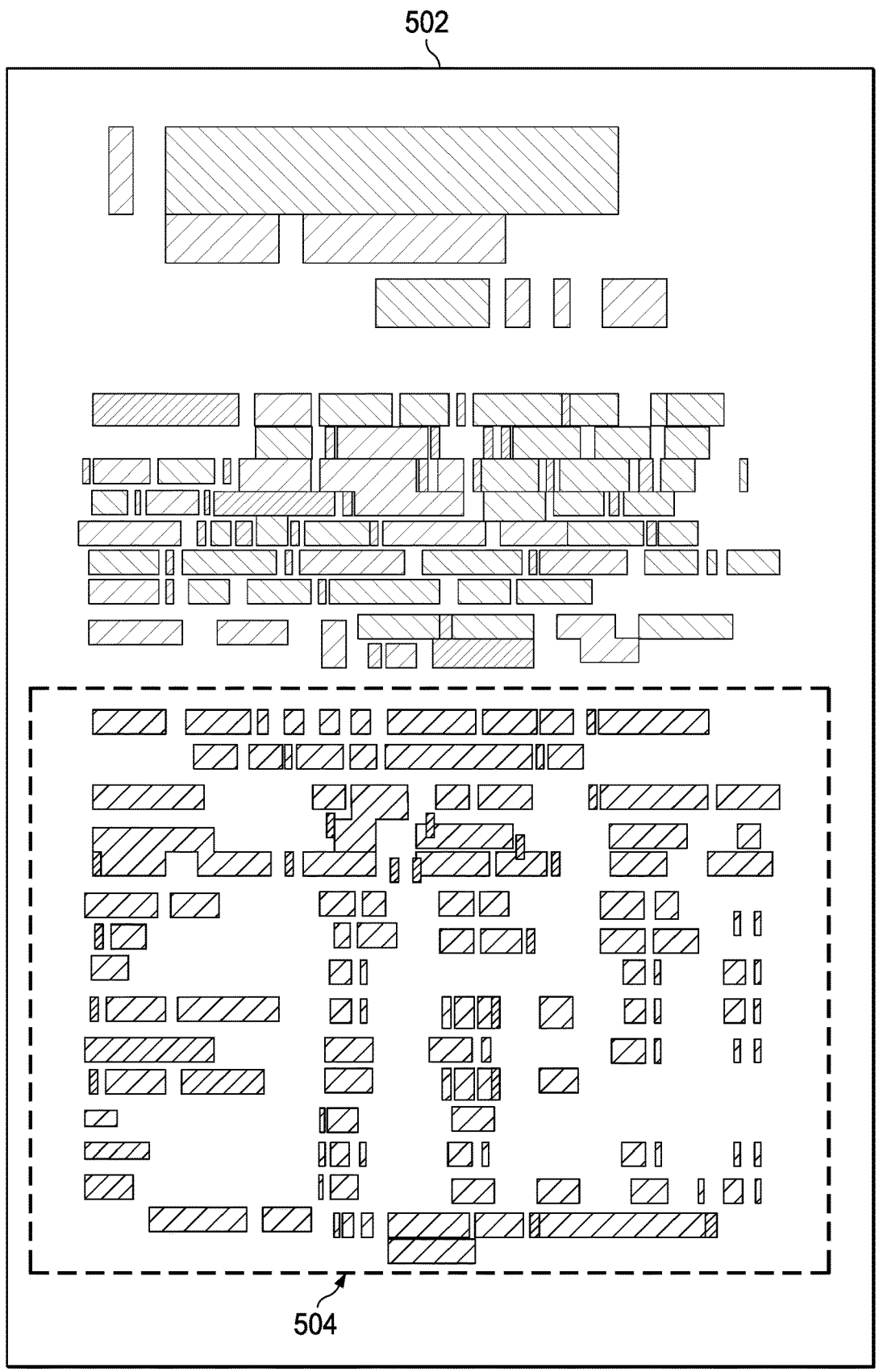

FIGS. 5A-5D depict the example image 402 of FIGS. 4A-4D in association with another example text-map 502 of FIG. 5C and another example text region of interest 506 of FIG. 5D. More specifically, FIG. 5A includes the image 402 of FIG. 4A, FIG. 5B includes the example OCR-processed image of interest 404 of FIG. 4B, FIG. 5C includes the text-maps 502 including an example second color-coded text region of interest 504, and FIG. 5D includes a highlighted text region of interest 506 and an example result image 508.

In the example of FIGS. 5A-5D, the image 402 is a food product label including multiple regions of text (e.g., an ingredients list, a nutrition facts table, a product description, etc.). As such, the OCR-processed image of interest 404 (FIG. 5B) represents the resulting extraction from OCR analysis. In the OCR-processed image of interest 404, various text characters and/or words are identified for further analysis of the context in which the identified text characters and/or words are located.

After the OCR analysis on the image 402 (e.g., the recognition of text in the OCR-processed image of interest 404), the example second text-maps 502 (FIG. 5B) are generated. The example second text-maps 502 are shown as an overlay of multiple color-coded text-maps (e.g., an overlay of a first color-coded text-map, a second color-coded text-map, and a third color-coded text-map) merely by way of example to show locations of different color-coded text locations relative to one another. For example, the word "protein" has a high probability of belonging to a nutrition facts table, and, as such, the second color-coded text region of interest 504 is colored in the second text-map 502 with a relatively higher intensity than other words that are found in nutrition facts tables less often. In implementation, the text-maps 406 are separated and provided separately to the CNN 110, as described above in connection with FIG. 2. As such, second text-maps 502 are a visual representation including various colors corresponding to different text satisfying text characteristics corresponding to those colors. In FIGS. 5A-5D, the second color-coded text region of interest 504 corresponds to a desired context of text that includes a nutrition facts table.

In the example of FIG. 5D, the result image 508 includes a highlighted area identified by the CNN 110 as being the text region of interest 506. The text region of interest 506 represents the identified region and/or location corresponding to an intensely colored region in the second text-map 502. In the example of FIG. 5D, the text region of interest 506 represents the nutritional facts section.

Figure 6:
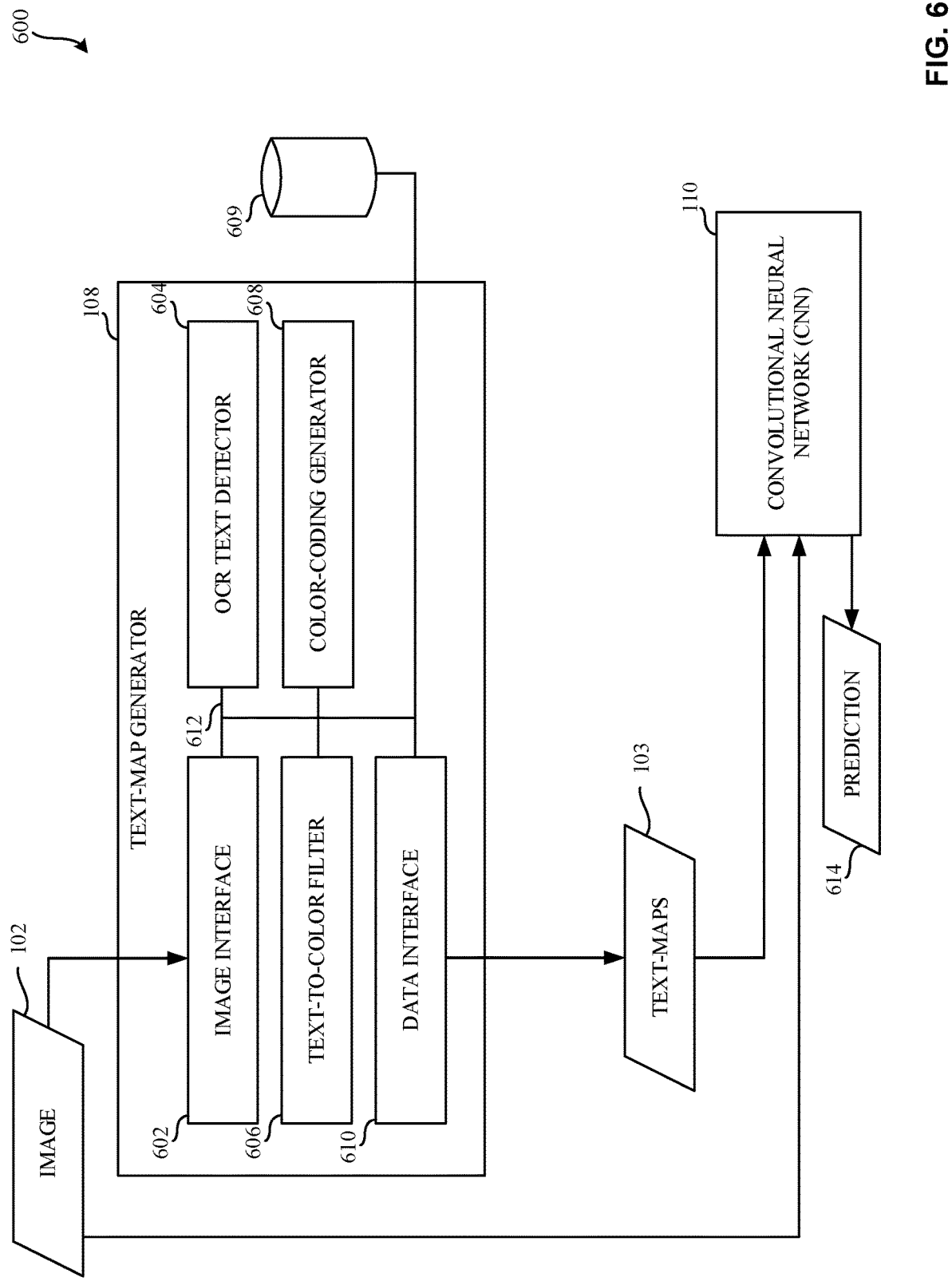
FIG. 6 is an example block diagram of the text-map generator in circuit with the CNN of FIG. 1.

FIG. 6 is an example block diagram 600 of the text-map generator 108 in circuit with the CNN 110 of FIG. 1. The text-map generator 108 includes an example image interface 602, an example OCR text detector 604, an example text-to-color filter 606, an example color-coding generator 608, and an example data interface 610. In examples disclosed herein, an example communication bus 612 allows for communication between any of the image interface 602, the OCR text detector 604, the text-to-color filter 606, the color-coding generator 608, and/or the data interface 610. The communication bus 612 may be implemented using any suitable kind of communication bus.

In the example of FIG. 6, the image interface 602 obtains the image 102. For example, the image interface 602 communicates with the image repository 106 of FIG. 1 to obtain and/or otherwise retrieve the image 102. In some examples disclosed herein, the image 102 may be an image of any one of the items 101 of FIG. 1, or any other suitable image and/or readable file (e.g., a PDF file). In other examples disclosed herein, the image interface 602 may obtain images (e.g., training images) for use in training the CNN 110.

In the example of FIG. 6, the OCR text detector 604 communicates with the image interface 602 to perform OCR analysis on the image 102. In examples disclosed herein, the OCR text detector 604 extracts textual information from the image 102. For example, the OCR text detector 604 extracts all text characters and/or words from the image 102 for later use. In examples disclosed herein, the OCR text detector 604 converts text on the image 102 to machine-readable digital text. In some examples disclosed herein, the OCR text detector 604 may be implemented using any suitable logic circuit and/or machine-executable program suitable to convert text information on the image 102 into machine-readable digital text.

In the example of FIG. 6, the text-to-color filter 606 communicates with the OCR text detector 604 to obtain the image 102 in response to text-recognition being complete. The text-to-color filter 606 selects a text characteristic for use in analyzing the extracted text. Examples of such text analysis include a word occurrence ratio indicative of a number of occurrences of a word inside a text region of interest relative to total occurrences of the word in the entire image, punctuation signs, Bayesian distance between a word and a dictionary of keywords, etc. In examples disclosed herein, the text characteristic may be specified via user input and/or specified in a configuration file. In addition, the text-to-color filter 606 selects different colors to mark text satisfying corresponding text characteristics. In examples disclosed herein, the text-to-color filter 606 pairs a color with a corresponding text characteristic and transmits such paring to the color-coding generator 608.

In examples disclosed herein, the text-to-color filter 606 determines what extracted text of the image 102 satisfies different ones of the text characteristics (e.g., matches, satisfies a threshold, etc.). For example, a text characteristic may be punctuation such that any punctuation text satisfies the text characteristic. In such examples, the text-to-color filter 606 may determine the locations of all punctuation text on the image 102 and provides the locations to the color-coding generator 608 in association with the text characteristic. Furthermore, the text-to-color filter 606 may determine if the extracted text on the image 102 satisfies a second text characteristic. For example, the second text characteristic may specify that text must match words in a dictionary. In the example of FIG. 6, the dictionary is a custom-build dictionary that includes words found to be relevant to a particular context corresponding to a region of interest for which the CNN 110 is to search in the image 102. For example, if the image 102 is of a food product, and the region of interest is a nutrition facts table, the dictionary includes nutrition terms such as calories, carbohydrates, sodium, protein, sugar, etc. If the image 102 is a computer product webpage, and the region of interest is the specifications table, the dictionary includes technical terms typically used to describe technical specifications of computers. In the example of FIG. 6, an example text database 609 stores the dictionary or a plurality if dictionaries for different text contexts. In the example of FIG. 6, the text-to-color filter 606 compares the extracted text of the image 102 with the words appearing in the text database 609. In such examples, in response to the text-to-color filter 608 determining matches between the extracted text of the image 102 and one or more words in the text database 609 the text-to-color filter 606 determines the locations of the text satisfying the second characteristic and provides the locations to the color-coding generator 608. Likewise, the text-to-color filter 606 may reiterate the above process using different colors corresponding to different text characteristics. In examples disclosed herein, text location information generated by the text-to-color filter 606 is in the form of pixel coordinates defining the boundaries of text satisfying the different text characteristics. In other examples disclosed herein, the text database 609 may be implemented internal and/or external to the text-map generator 108.

In the example of FIG. 6, a third text characteristic can be a word occurrence ratio of a word in the image 102. In such examples, the example text-to-color filter 606 counts and/or otherwise records the number of times an extracted word from the image 102 appears in the text region of interest 114 relative to the occurrences of the word in the whole image 102. For example, the text-to-color filter 606 may determine and record a ratio representing a proportion and/or ratio of the total number of times the word "fiber" appears on a product label in the text region of interest 114 relative to in the whole image. For example, if the total number of times "fiber" appears in the whole image of a product label is 100, and the number times the word "fiber" appears in the text region of interest 114 is 10, then the text-to-color filter 606 records a ratio of 1:10 with respect to the word "fiber." In another example, the text-to-color filter 606 may determine and record a percentage value representative of the number of times the word "fiber" appears in a whole image of a food product label relative to "fiber" appearing in the text region of interest 114 of the product label. For example, if the total number of times "fiber" appears in a whole image of a product label is 100 and the number times the word "fiber" appears in the text region of interest 114 of the product label is 10, then the text-to-color filter 606 records a percentage value of 10% for the word "fiber." As yet another example text characteristic, the text-to-color filter 606 may record and/or otherwise indicate whether the word "fiber" appears more than an occurrence threshold (e.g., greater than five) in the text region of interest 114. The text-to-color filter 606 utilizes an example ratio, an example proportion, an example percentage, and/or an example occurrence threshold indicator to determine the location(s) of the text satisfying such criteria, and provides the location(s) to the color-coding generator 608.

In the example of FIG. 6, the color-coding generator 608 generates a plurality of color-coded text-maps 103 (FIG. 1) based on text location information from the text-to-color filter 606 and based on the text characteristic-to-color pairing from the text-to-color filter 606. In the example of FIG. 6, the color-coding generator 608 generates respective color-coded text-maps 103 for each respective text characteristic. For example, the color-coding generator 608 generates a plurality of color-coded text-map 103 images, the plurality of color-coded text-map images 103 including color-coded segments with different colors, the color-coded segments based on the text location information of text in the image 102 that satisfies the different text characteristics.

In addition, the color-coding generator 608 can color code using multiple levels of intensity. Such different color intensity levels can be based on how often particular text is known to appear in a particular context across different items relative to other text. For example, both water and apples may be in a dictionary of the text database 609 for the context of ingredients list. However, the term water may be marked with a higher intensity color shading than the term apples although both are marked with the same color. In such example, the reason for the higher intensity shading for water is that water is known to occur more often across ingredients lists than apples.

In the example of FIG. 6, the data interface 610 communicates with the color-coding generator 608 to obtain the generated color-coded text-maps 103. The data interface 610 provides the color-coded text-maps 103 to the CNN 110. If the text-map generator 108 is on a separate machine from the CNN 110, the data interface 610 may transmit the color-coded text-maps 103 to the CNN 110 via any suitable wired and/or wireless communication. If the text-map generator 108 and the CNN 110 are implemented on the same machine, the data interface 610 provides the color-coded text-maps 103 to the CNN 110 via a data bus or a function call or by storing the color-coded text-maps 103 in a memory location accessible by the CNN 110.

In FIG. 6, the CNN 110 processes the obtained color-coded text-maps 103 to generate an example prediction 614. In examples disclosed herein, the prediction 614 is the result of the CNN 110 generating probability values representative of likelihoods that different text regions of the input image 102 are the text region of interest selected to be identified by the CNN 110. For example, the CNN 110 can determine, utilizing the color-coded text-maps 103 and the image 102, the text region of interest on the image 102 and a region not of interest on the image 102. For example, the CNN 110 may identify a region not of interest as separate from the text region of interest even when a same keyword is determined to appear in both the text region of interest and the region that is not of interest. The prediction 614 is highly accurate because even though keywords may appear in different regions of text of an input image 102 (including in the text region of interest and in text regions not of interest), the text region of interest will have more relevancy-indicating color shading and higher color intensity usage corresponding to text located therein than other text regions of the input image 102. Such prediction 614 may be in the form of percentages representing the probability values.

Figure 7:
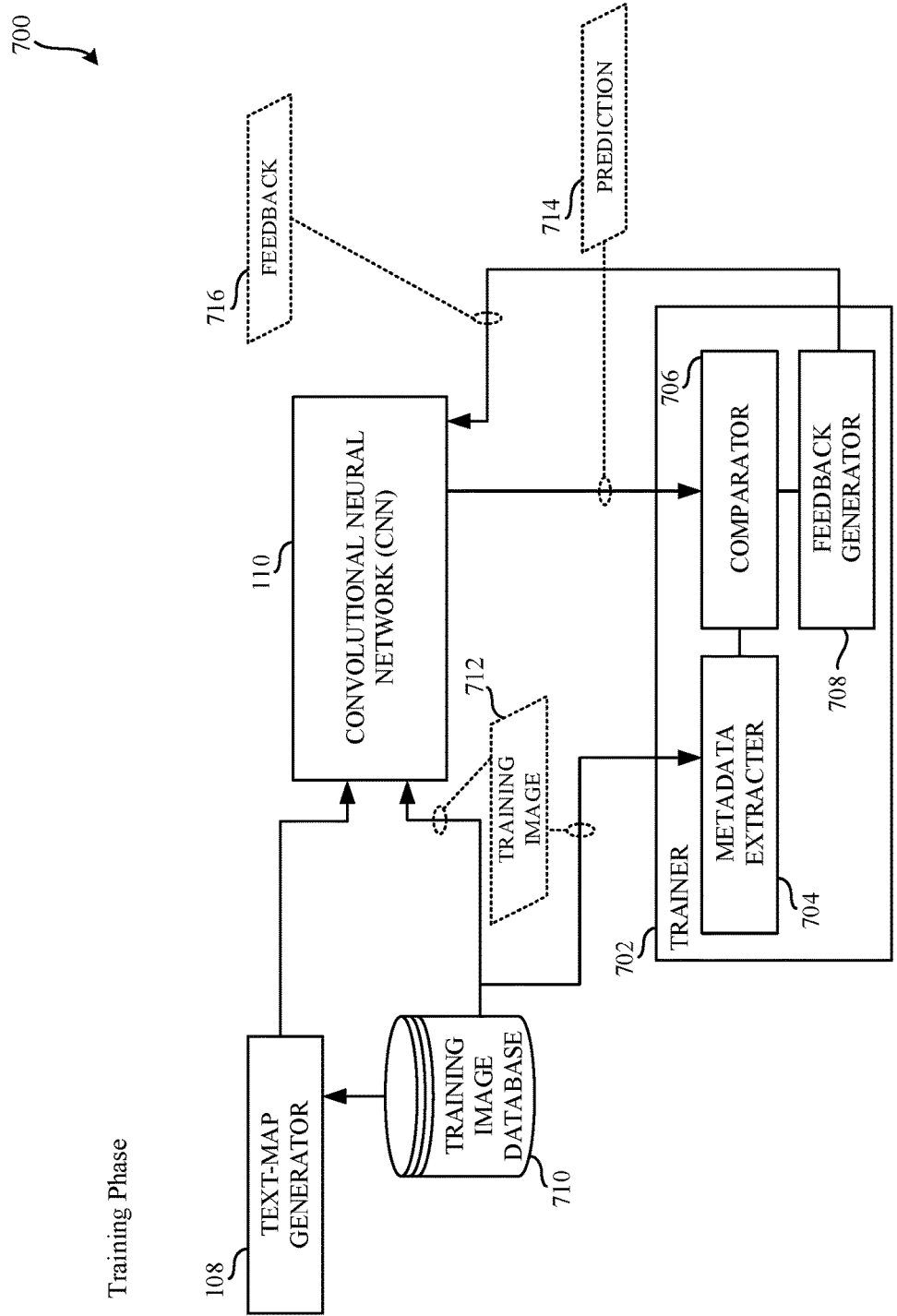
FIG. 7 is an example block diagram of a trainer in circuit with the CNN of FIG. 1 to train the CNN to determine locations of text regions of interest in images.

FIG. 7 is an example block diagram 700 of a trainer 702 in circuit with the CNN 110 of FIG. 1 to train the CNN 110 to determine locations of text regions of interest in images. The example trainer 702 includes an example metadata extracter 704, an example comparator 706, and an example feedback generator 708. In examples disclosed herein, the trainer 702 communicates with an example training images database 710 to obtain an example training image 712.

In the example of FIG. 7, the metadata extracter 704 determines whether the training image 712 is available. Additionally, the metadata extracter 704 obtains and/or otherwise retrieves the training image 712 and extracts metadata from the training image 712 as reference information to facilitate training of the CNN 110. In examples disclosed herein, the metadata extracter 704 extracts metadata indicative of the actual location (e.g., a training reference location) of the desired text context (e.g., the text region of interest) in the training image 712. The metadata extracter 704 provides the training reference location to the comparator 706. In other examples disclosed herein, the metadata extracter 704 may be implemented using any suitable residual neural network (ResNet) in connection with a convolutional neural network (e.g., the CNN 110 of FIG. 1). For example, the metadata extracter 704 may be a ResNet backbone including a learning rate, a weight decay, a dropout keep probability, a batch size, and/or an optimizer (e.g., an Adam optimizer) during ten epochs (e.g., one forward pass through the trainer 702 and one reverse pass through the trainer 702). In other examples disclosed herein, the metadata extracter 704 may be implemented using any suitable neural network training backbone.

In the example of FIG. 7, the comparator 706 obtains the training reference location of the desired text context (e.g., the text region of interest) from the metadata extracter 704, and obtains an example prediction value 714 produced by the CNN 110 of the predicted location of the desired text context (e.g., the text region of interest). The comparator 706 determines the difference between the prediction value 714 and the training reference location of the desired text context (e.g., the text region of interest). In examples disclosed herein, comparator 706 generates an error value representative of the difference between the prediction value 714 and the training reference location of the desired text context (e.g., the text region of interest).

In the example illustrated in FIG. 7, the feedback generator 708 communicates with the comparator 706 to obtain the generated error value. In examples disclosed herein, the feedback generator 708 provides the error value to the CNN 110 in the form of example feedback 716. In examples disclosed herein, the feedback generator 708 reformats and/or otherwise processes the error value from the comparator 706 to provide the feedback 716 to the CNN 110. As such, the CNN 110 utilizes the feedback 716 to modify its parameters to alter its prediction for future training images (e.g., a new training image from the training image database 710). In examples disclosed herein, the parameters of the CNN 110 refers to any suitable configuration variable in the CNN 110 (e.g., weights, etc.).

FIG. 8 depicts example images 802, 804, 806 and a text region of interest 801 identified by the CNN 110 of FIGS. 1, 2, 6, and 7 based on teachings of this disclosure. In the example of FIG. 8 the text region of interest 801 represent detection results from the CNN 110 of FIG. 1 utilizing the text-map generator 108 of FIG. 1.

In the example of FIG. 8, the first image 802, the second image 804, and the third image 806 include different sections of a product label or product packaging to be analyzed. The example of FIG. 8 illustrates the text region of interest 801 as being in the second image 804.

Additionally, the text region of interest 801 represents the prediction region located in the second image 804, along with an example prediction performance. In this example, the prediction performance is 0.91, or 91 percent. Illustrated in Table 1 below, the prediction performance when utilizing the text-map generator 108 with the CNN 110 of FIG. 1 is higher (e.g., more certainty) than when utilizing only a CNN (e.g., the CNN 110 of FIG. 1).

TABLE 1

| | Prediction Performance | | | | | |
|---|---|---|---|---|---|---|
| | CNN without text-maps | | | CNN with text-maps | | |
| | Precision | Recall | Accuracy | Precision | Recall | Accuracy |
| Ingredients | 0.25 | 0.31 | 0.15 | 0.70 | 0.73 | 0.56 |
| Nutritional Facts | 0.34 | 0.57 | 0.27 | 0.72 | 0.81 | 0.62 |
| Totals | 0.29 | 0.44 | 0.21 | 0.71 | 0.77 | 0.59 |

In Table 1 above, the Precision represents a performance rate that is the relationship between true positives and the sum of true positives and false positives predicted by a CNN with respect to locations of text regions of interest, the Recall represents a rate that is the relationship between true positives and the sum of true positives and false negatives predicted by a CNN with respect to locations of text regions of interest, and Accuracy represents the overall performance (e.g., the relationship between true positives and the sum of true positives, false positives, and false negatives) of the CNN. As shown in Table 1 above, across two contexts of text (e.g., ingredients and nutritional facts), the CNN with text-maps (e.g., the CNN 110 utilizing the text-map generator 108) is more accurate than a CNN without text-maps.

While an example manner of implementing the text-map generator 108 of FIG. 1 is illustrated in FIGS. 6-7, one or more of the elements, processes and/or devices illustrated in FIGS. 6-7 may be combined, divided, re-arranged, omitted, eliminated and/or implemented in any other way. Further, the example image interface 602, the example OCR text detector 604, the example text-to-color filter 606, the example color-coding generator 608, the example data interface 610, and/or, more generally, the example text-map generator 108 of FIG. 1, and/or the example metadata extracter 704, the example comparator 706, the example feedback generator 708, and/or, more generally, the example trainer 702 of FIG. 7, and/or the example training image database 710 of FIG. 7, and/or the example CNN 110 of FIGS. 1, 2, 6 and/or 7 may be implemented by hardware, software, firmware and/or any combination of hardware, software and/or firmware. Thus, for example, any of the example image interface 602, the example OCR text detector 604, the example text-to-color filter 606, the example color-coding generator 608, the example data interface 610, and/or, more generally, the example text-map generator 108 of FIG. 1, and/or the example metadata extracter 704, the example comparator 706, the example feedback generator 708, and/or, more generally, the example trainer 702 of FIG. 7, and/or the example training image database 710 of FIG. 7, and/or the example CNN 110 of FIGS. 1, 2, 6 and/or 7 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example image interface 602, the example OCR text detector 604, the example text-to-color filter 606, the example color-coding generator 608, the example data interface 610, and/or, more generally, the example text-map generator 108 of FIG. 1, and/or the example metadata extracter 704, the example comparator 706, the example feedback generator 708, and/or, more generally, the example trainer 702 of FIG. 7, and/or the example training image database 710 of FIG. 7, and/or the example CNN 110 of FIGS. 1, 2, 6 and/or 7 is/are hereby expressly defined to include a non-transitory computer readable storage device or storage disk such as a memory, a digital versatile disk (DVD), a compact disk (CD), a Blu-ray disk, etc. including the software and/or firmware. Further still, the example text-map generator 108 of FIG. 1 may include one or more elements, processes and/or devices in addition to, or instead of, those illustrated in FIG. 6-7, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic, machine readable instructions, hardware implemented state machines, and/or any combination thereof for implementing the text-map generator 108 of FIG. 1 is shown in FIGS. 6-7. The machine readable instructions may be one or more executable programs or portion(s) of an executable program for execution by a computer processor such as the processor 1312 shown in the example processor platform 1300 discussed below in connection with FIG. 13. The program may be embodied in software stored on a non-transitory computer readable storage medium such as a CD-ROM, a floppy disk, a hard drive, a DVD, a Blu-ray disk, or a memory associated with the processor 1312, but the entire program and/or parts thereof could alternatively be executed by a device other than the processor 1312 and/or embodied in firmware or dedicated hardware. Further, although the example program is described with reference to the flowcharts illustrated in FIGS. 9-12, many other methods of implementing the example text-map generator 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 9-12 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

Figure 9:
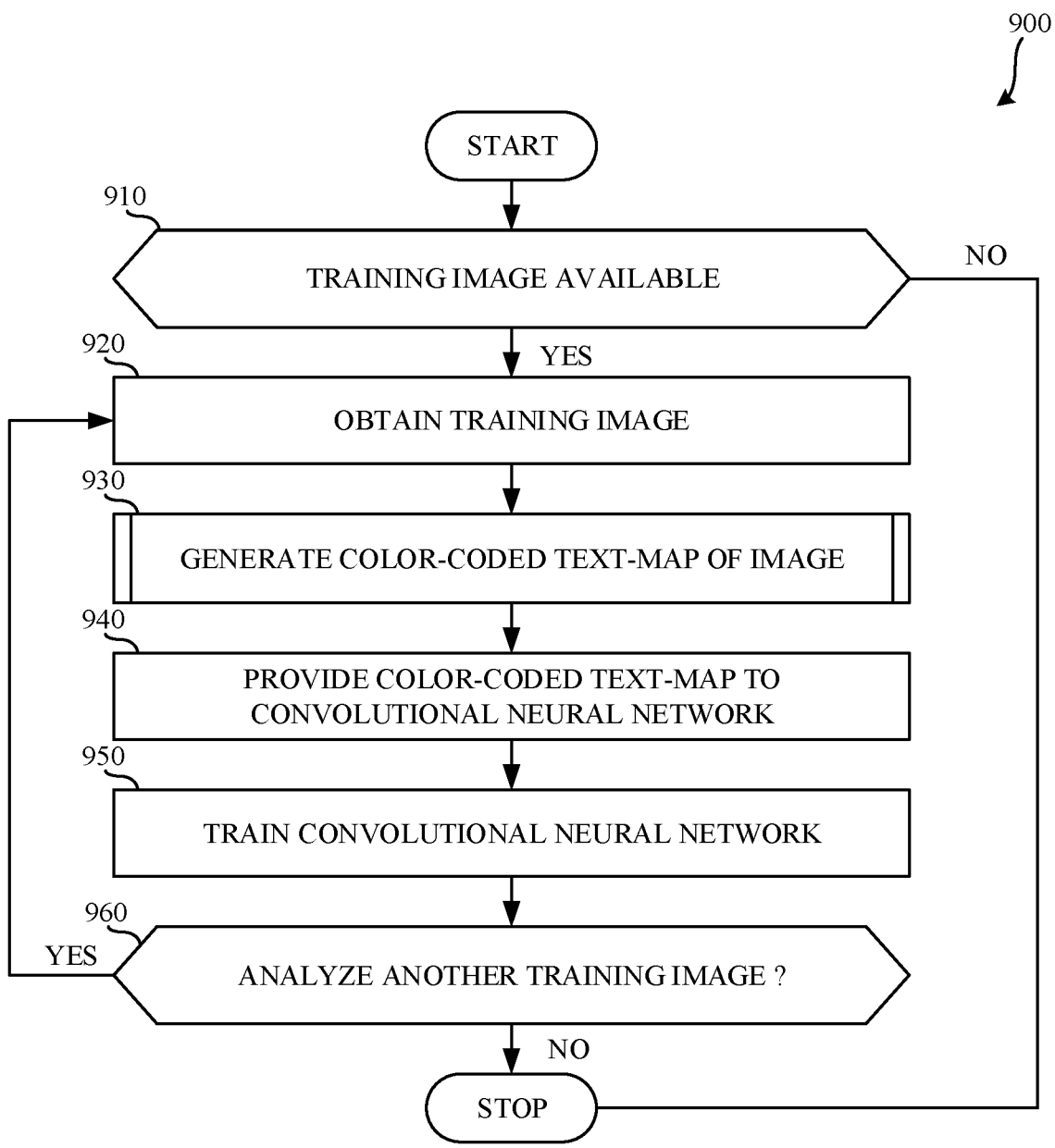
FIG. 9 is a flowchart representative of example machine readable instructions which may be executed to implement the trainer of FIG. 7 to train the CNN of FIGS. 1, 2, 6, and 7.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A FIG. 9 is a flowchart 900 representative of example machine readable instructions which may be executed to implement the trainer 702 of FIG. 7 to train the CNN 110 of FIGS. 1, 2, 6, and 7. The example image interface 602 determines whether a training image (e.g., the training image 712 of FIG. 7) is available (block 910). In other examples disclosed herein, the metadata extracter 704 may determine at block 910 whether a training image (e.g., the training image 712 of FIG. 7) is available. If a training image (e.g., the training image 712 of FIG. 7) is not available, the example process of FIG. 9 ends. Alternatively, in response to the control of block 910 indicating a training image (e.g., the training image 712 of FIG. 7) is available, the image interface 602 obtains the training image (e.g., the training image 712 of FIG. 7) (block 920). Additionally or alternatively, the metadata extracter 704 (FIG. 7) may obtain the training image (e.g., the training image 712 of FIG. 7) at block 920.

In response, the text-map generator 108 of FIG. 1 generates a color-coded text-map of the training image (e.g., the training image 712 of FIG. 7) (block 930). Example instructions that may be executed to implement block 930 are described below in connection with FIGS. 11 and 12. The data interface 610 of FIG. 6 provides the color-coded text-map to the CNN 110 (block 940). The trainer 702 trains the CNN 110 based on the color-coded text-map and the training image (e.g., the training image 712 of FIG. 7) (block 950). The trainer 702 determines whether to analyze another training image (block 960). If the trainer 702 determines to analyze another training image, control returns to block 920. Alternatively, if the trainer 702 determines to not analyze another training image, the example process of FIG. 9 stops. In examples disclosed herein, control ceases to operate in response to the comparator 706 and/or the feedback generator 708 determining that the CNN 110 is sufficiently trained by predicting a location of a text region of interest with a sufficient level of certainty. For example, the comparator 706 compares a prediction 714 (FIG. 7) from the CNN 110 with the actual location of a text region of interest from the metadata extractor 704. When the comparison confirms a sufficiently close match (e.g., within an error threshold), the feedback generator 708 confirms the CNN 110 is sufficiently trained.

Figure 10:
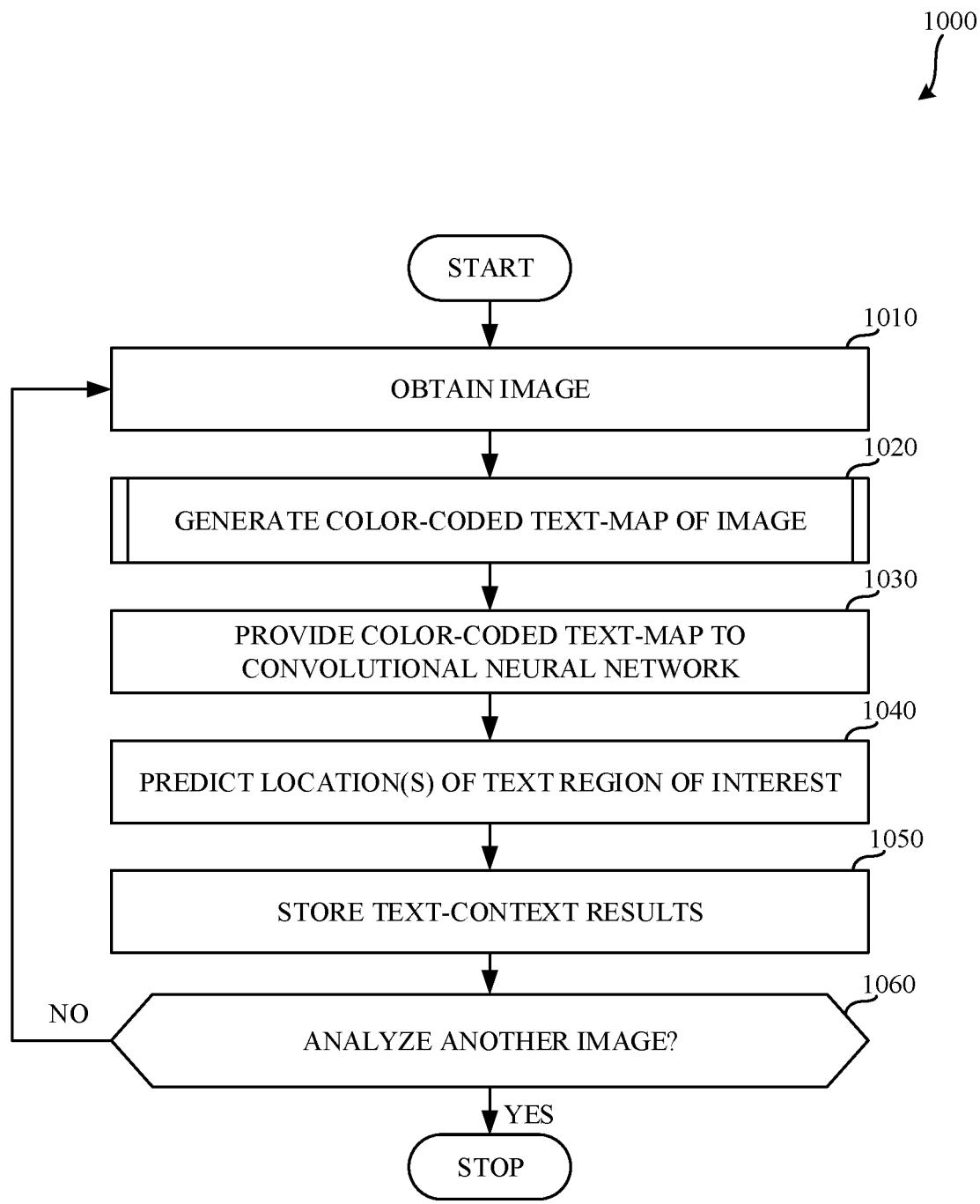
FIG. 10 is a flowchart representative of example machine readable instructions which may be executed to implement the text-map generator and the CNN of FIGS. 1, 2, 6, and 7 to determine location(s) of text regions of interest in images.

FIG. 10 is a flowchart 1000 representative of example machine readable instructions which may be executed to implement the text-map generator 108 and the CNN 110 of FIGS. 1, 2, 6, and 7 to determine location(s) of text regions of interest in images. The image interface 602 obtains an image (e.g., the image 102) (block 1010). In response, the text-map generator 108 generates a color-coded text-map of the image (block 1020). Example instructions that may be executed to implement block 1020 are described below in connection with FIGS. 11 and 12.

In the example of FIG. 10, the data interface 610 of FIG. 6 provides the color-coded text-map to the CNN 110 (block 1030). For example, the data interface 610 may send a plurality of color-coded text-maps to the CNN 110 or store the color-coded text maps in a memory accessibly by the CNN 110. In response, the CNN 110 predicts the location of the text region of interest (block 1040). For example, the CNN 110 may determine a first region in an image as more likely to be the first text region of interest than a second region in the image corresponding to the second text region that is not of interest based on performing CNN analysis on the image and the plurality of color-coded text-map images. Additionally, the CNN 110 stores the text-context results in memory (block 1050). The text-map generator 108 determines whether another image to analyze is available (block 1060). In response to determining another image to analyze is available, control returns to block 1010. Alternatively, if another image to analyze is not available, the example process of FIG. 10 ends.

Figure 11:
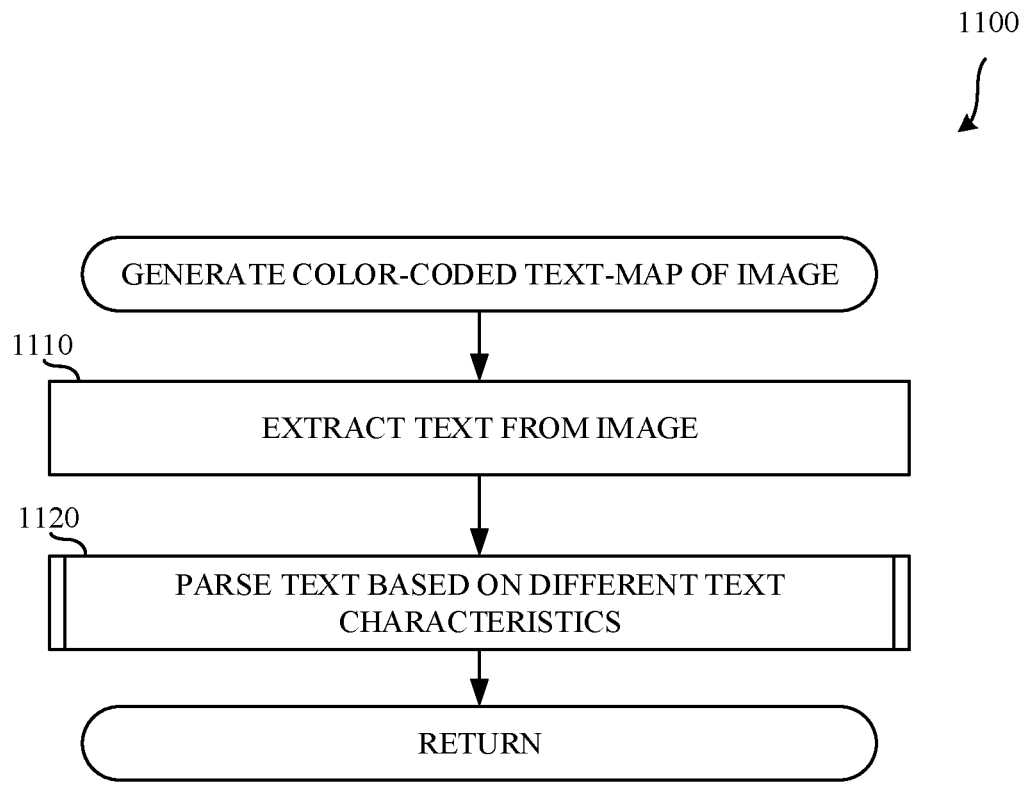
FIG. 11 is a flowchart representative of example machine readable instructions which may be executed to implement the text-map generator of FIGS. 1, 6, and 7 to generate color-coded text-maps of an example image.

FIG. 11 is a flowchart 1100 representative of example machine readable instructions which may be executed to implement the text-map generator 108 of FIGS. 1, 6, and 7 to generate color-coded text-maps 103 of an example image 102. In examples disclosed herein, the instructions represented by FIG. 11 may be executed to implement block 930 of FIG. 9 and/or block 1020 of FIG. 10. In FIG. 11, the OCR text detector 604 extracts the text from an image (e.g., the image 102 of FIG. 1) (block 1110). For example, the OCR text detector 604 may extract and/or generate text data from an image that includes a first text region of interest and a second text region not of interest.

At block 1120, the text-to-color filter 606 and the color-coding generator 608 of FIG. 6 parse text based on different text characteristics. Example instructions to execute block 1120 are described below in connection with FIG. 12. In response to completion of block 1120, control returns to a calling function or process such as a process implemented by the instructions represented by FIG. 9 and/or FIG. 10.

Figure 12:
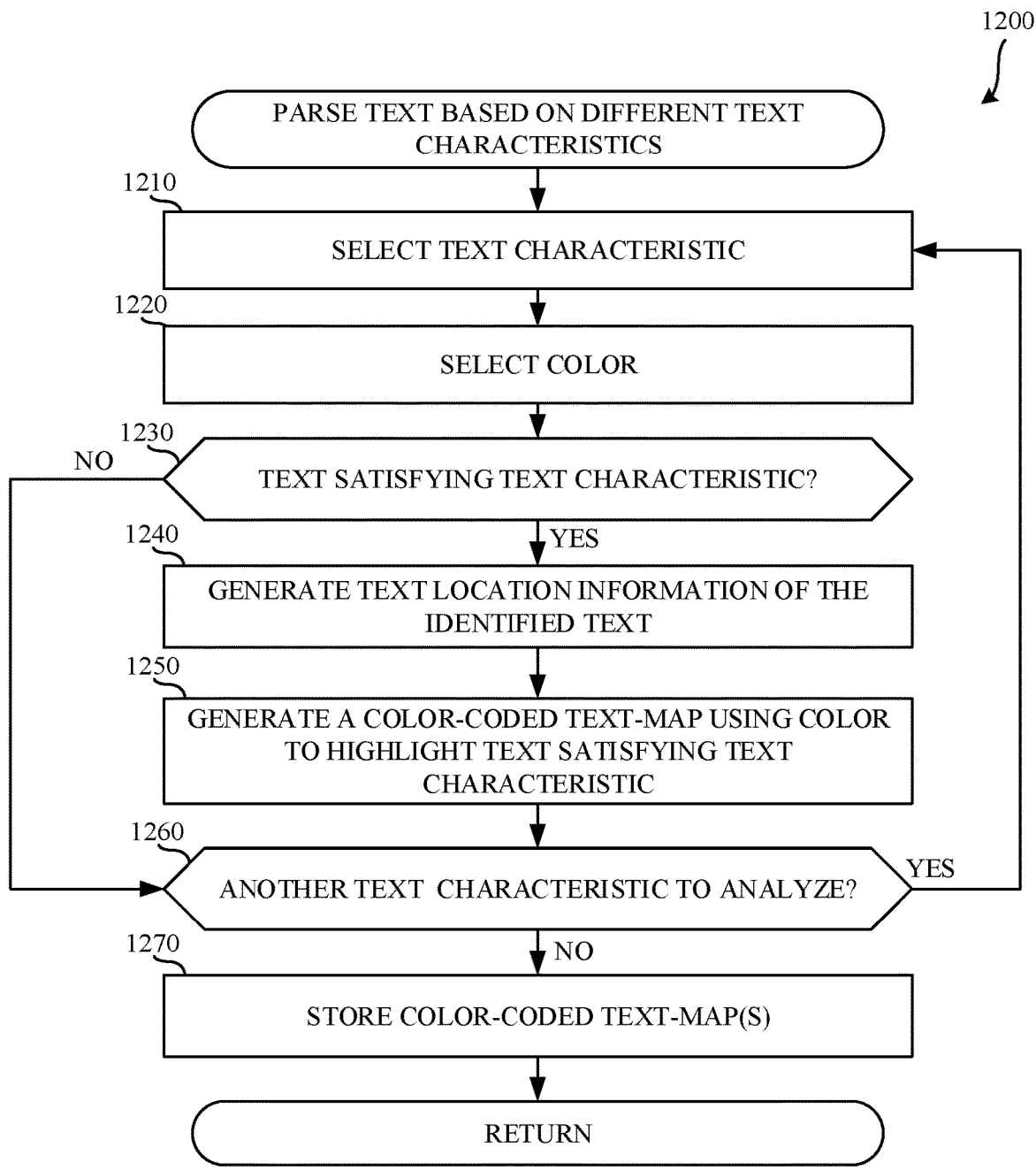
FIG. 12 is a flowchart representative of example machine readable instructions which may be executed to implement the color-coding generator of FIG. 6 to parse text of an image and apply color coding based on different text characteristics.

FIG. 12 is a flowchart 1200 representative of example machine readable instructions which may be executed to implement the color-coding generator 108 of FIG. 6 to parse text of an image and apply color coding based on different text characteristics. The instructions represented by FIG. 12 may be executed to implement block 1120 of FIG. 11. The text-to-color filter 606 selects a text characteristic to be analyzed (block 1210). For example, the text-to-color filter 606 may determine to analyze and/or otherwise identify the punctuation marks on the image (e.g., the image 102 of FIG. 6). In other examples disclosed herein, the text-to-color filer 606 may determine to analyze and/or otherwise identify the words on the image (e.g., the image 102 of FIG. 6) that match keywords in a dictionary. Another example text characteristic is the quantity of occurrences of text or a word in the image. In examples disclosed herein, the text-to-color filter 606 may select any suitable text characteristic.

The text-to-color filter 606 selects a corresponding color (block 1220). For example, for each selected text characteristic, the text-to-color filter 606 pairs an individual color. The text-to-color filter 606 determines text on the image that satisfies the text characteristic (block 1230). If the text-to-color filter 606 determines text that satisfies the text characteristic, the text-to-color filter 606 generates text location information of the identified text (block 1240). The color-coding generator 608 generates a color-coded text-map using color (e.g., the color selected in block 1220) to highlight the text satisfying the text characteristic (block 1250) based on the text location information from the text-to-color filter 606. For example, to execute block 1250, the color-coding generator 608 may generate a plurality of color-coded text-map images, the plurality of color-coded text-map images including color-coded segments with different colors, the color-coded segments corresponding to text having different text characteristics. If the color-coding generator 608 determines text in the image does not satisfy the text characteristic, or after creating the color-coded text-map at block 1250, the color-coding generator 608 determines whether another text characteristic is to be analyzed (block 1260).

If the color-coding generator 608 determines at block 1260 that another text characteristic is to be analyzed, then control returns to block 1210. Alternatively, if the color-coding generator 608 determines at block 1260 there is not another text characteristic to be analyzed, the color-coding generator 608 stores the generated color-coded text-map(s) in memory (block 1270). Control returns to a calling function or process such as the process implemented by the instructions represented by FIG. 11.

Figure 13:
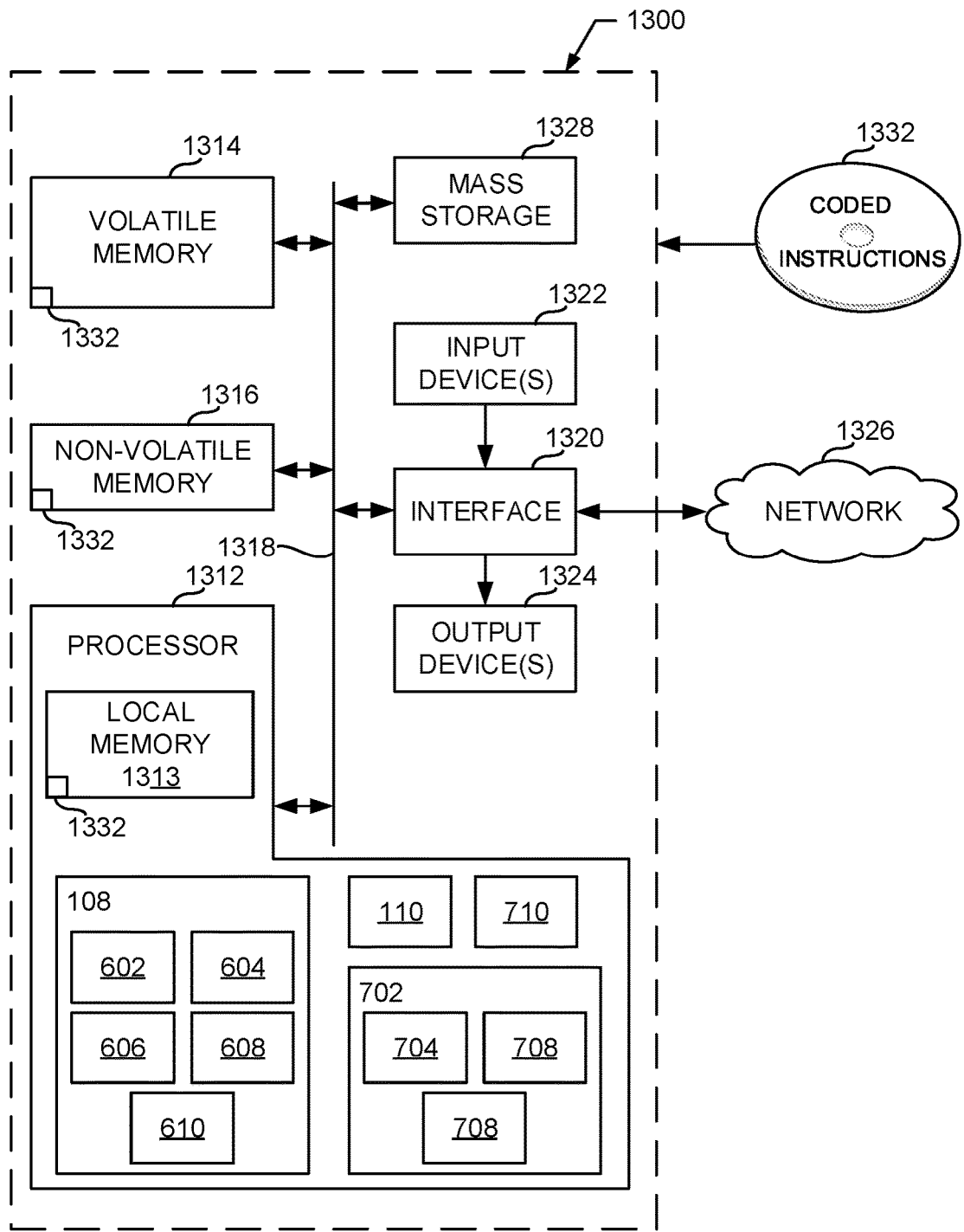
FIG. 13 is a block diagram of an example processing platform structured to execute the instructions of FIGS. 9-12 to implement the text-map generator and/or the convolutional neural network of FIGS. 1, 2, 6, and 7.

FIG. 13 is a block diagram of an example processing platform structured to execute the instructions of FIGS. 9-12 to implement the text-map generator 108 and/or the convolutional neural network 110 of FIGS. 1, 2, 6, and 7. The processor platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1300 of the illustrated example includes a processor 1312. The processor 1312 of the illustrated example is hardware. For example, the processor 1312 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example image interface 602, the example OCR text detector 604, the example text-to-color filter 606, the example color-coding generator 608, the example data interface 610, and/or, more generally, the example text-map generator 108 of FIG. 1, and/or the example metadata extracter 704, the example comparator 706, the example feedback generator 708, and/or, more generally, the example trainer 702 of FIG. 7, and/or the example training image database 710 of FIG. 7, and/or the example CNN 110 of FIGS. 1, 2, 6, and/or 7.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1316 may be implemented by flash memory and/or any other desired type of memory device. Access to the main memory 1314, 1316 is controlled by a memory controller.

The processor platform 1300 of the illustrated example also includes an interface circuit 1320. The interface circuit 1320 may be implemented by any type of interface standard, such as an Ethernet interface, a universal serial bus (USB), a Bluetooth® interface, a near field communication (NFC) interface, and/or a PCI express interface.

In the illustrated example, one or more input devices 1322 are connected to the interface circuit 1320. The input device(s) 1322 permit(s) a user to enter data and/or commands into the processor 1012. The input device(s) can be implemented by, for example, a camera (still or video), a keyboard, a button, a mouse, a touchscreen, a track-pad, a trackball, and/or isopoint system.

One or more output devices 1324 are also connected to the interface circuit 1320 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1320 of the illustrated example, thus, typically includes a graphics driver card, a graphics driver chip and/or a graphics driver processor.

The interface circuit 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1326. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1300 of the illustrated example also includes one or more mass storage devices 1328 for storing software and/or data. Examples of such mass storage devices 1328 include floppy disk drives, hard drive disks, compact disk drives, Blu-ray disk drives, redundant array of independent disks (RAID) systems, and digital versatile disk (DVD) drives.

Machine executable instructions 1332 represented by the flowcharts of FIGS. 9-12 may be stored in the mass storage device 1328, in the volatile memory 1314, in the non-volatile memory 1316, and/or on a removable non-transitory computer readable storage medium such as a CD or DVD.

From the foregoing, it will be appreciated that example methods, apparatus and articles of manufacture have been disclosed that improve a computers accuracy in predicting text regions of interest in images including text characters and/or words using a convolutional neural network. The disclosed methods, apparatus and articles of manufacture increase the efficiency and accuracy of a computing device in detecting context of text by utilizing a plurality of color-coded text-maps generated by a text map generator to detect context of text using a convolutional neural network. The example disclosed methods, apparatus and articles of manufacture improve the efficiency of using a computing device by automatically identifying data relating to context of textual information in images. The example disclosed methods, apparatus and articles of manufacture are accordingly directed to one or more improvement(s) in the functioning of a computer.

Example methods, apparatus, systems, and articles of manufacture to detect a text region of interest in a digital image using machine-based analysis are disclosed herein. Further examples and combinations thereof include the following:

Example 1 includes an apparatus to analyze characteristics of text of interest, the apparatus comprising a text detector to provide text data from a first image, the first image including a first text region of interest and a second text region not of interest, a color-coding generator to generate a plurality of color-coded text-map images, the plurality of color-coded text-map images including color-coded segments with different colors, the color-coded segments corresponding to different text characteristics, and a convolutional neural network (CNN) to determine a first location in the first image as more likely to be the first text region of interest than a second location in the first image corresponding to the second text region that is not of interest based on performing a CNN analysis on the first image and the plurality of color-coded text-map images.

Example 2 includes the apparatus of example 1, wherein the plurality of color-coded text-map images includes a first color-coded text-map image and a second color-coded text-map image, the first color-coded text-map image including first color-coded segments of a first color, and the second color-coded text-map image including second color-coded segments of a second color.

Example 3 includes the apparatus of example 2, wherein the first color-coded segments correspond to a first text characteristic, and the second color-coded segments correspond to a second text characteristic.

Example 4 includes the apparatus of example 3, wherein the first color is different than the second color.

Example 5 includes the apparatus of example 1, wherein the CNN analysis identifies the second text region that is not of interest as separate from the first text region of interest when a same keyword appears in both the first text region of interest and the second text region that is not of interest.

Example 6 includes the apparatus of example 1, further including an interface to provide the plurality of color-coded text-map images to the CNN via a plurality of corresponding input channels of the CNN.

Example 7 includes the apparatus of example 1, wherein the first image is at least one of a food product label, a non-food product label, a sales receipt, a webpage, or a ticket.

Example 8 includes the apparatus of example 1, wherein the first text region of interest includes at least one of a nutrition facts table, a list of ingredients, a product description, candidate persons, numerical dates, or percentages.

Example 9 includes a non-transitory computer readable medium comprising computer readable instructions which, when executed, cause at least one processor to at least generate text data from a first image, the first image including a first text region of interest and a second text region not of interest, generate a plurality of color-coded text-map images, the plurality of color-coded text-map images including color-coded segments with different colors, the color-coded segments corresponding to different text characteristics, and determine a first location in the first image as more likely to be the first text region of interest than a second location in the first image corresponding to the second text region that is not of interest based on performing a CNN analysis on the first image and the plurality of color-coded text-map images.

Example 10 includes the computer readable medium of example 9, wherein the plurality of color-coded text-map images includes a first color-coded text-map image and a second color-coded text-map image, the first color-coded text-map image including first color-coded segments of a first color, and the second color-coded text-map image including second color-coded segments of a second color.

Example 11 includes the computer readable medium of example 10, wherein the first color-coded segments correspond to a first text characteristic, and the second color-coded segments correspond to a second text characteristic.

Example 12 includes the computer readable medium of example 11, wherein the first color is different than the second color.

Example 13 includes the computer readable medium of example 9, further including the at least one processor to identify the second text region that is not of interest as separate from the first text region of interest when a same keyword appears in both the first text region of interest and the second text region that is not of interest.

Example 14 includes the computer readable medium of example 9, further including the at least one processor to provide the plurality of color-coded text-map images to a CNN via a plurality of corresponding input channels of the CNN.

Example 15 includes the computer readable medium of example 9, wherein the first image is at least one of a food product label, a non-food product label, a sales receipt, a webpage, or a ticket.

Example 16 includes the computer readable medium of example 9, wherein the first text region of interest includes at least one of a nutrition facts table, a list of ingredients, a product description, candidate persons, numerical dates, or percentages.

Example 17 includes a method to analyze characteristics of text of interest, the method comprising generating text data from a first image, the first image including a first text region of interest and a second text region not of interest, generating a plurality of color-coded text-map images, the plurality of color-coded text-map images including color-coded segments with different colors, the color-coded segments corresponding to different text characteristics, and determining a first location in the first image as more likely to be the first text region of interest than a second location in the first image corresponding to the second text region that is not of interest based on performing a CNN analysis on the first image and the plurality of color-coded text-map images.

Example 18 includes the method of example 17, wherein the plurality of color-coded text-map images includes a first color-coded text-map image and a second color-coded text-map image, the first color-coded text-map image including first color-coded segments of a first color, and the second color-coded text-map image including second color-coded segments of a second color.

Example 19 includes the method of example 18, wherein the first color-coded segments correspond to a first text characteristic, and the second color-coded segments correspond to a second text characteristic.

Example 20 includes the method of example 19, wherein the first color is different than the second color.

Example 21 includes the method of example 17, further including identifying the second text region that is not of interest as separate from the first text region of interest when a same keyword appears in both the first text region of interest and the second text region that is not of interest.

Example 22 includes the method of example 17, further including providing the plurality of color-coded text-map images to the CNN via a plurality of corresponding input channels of the CNN.

Example 23 includes the method of example 17, wherein the first image is at least one of a food product label, a non-food product label, a sales receipt, a webpage, or a ticket.

Example 24 includes the method of example 17, wherein the first text region of interest includes at least one of a nutrition facts table, a list of ingredients, a product description, candidate persons, numerical dates, or percentages.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus to analyze characteristics of text of interest, the apparatus comprising:

text detector circuitry to provide text data from a first image, the first image including a first text region of interest and a second text region not of interest;

color-coding generator circuitry to generate a plurality of color-coded text-map images, the color-coded text-map images including color-coded segments with different colors, the color-coded segments corresponding to different text characteristics; and a convolutional neural network (CNN) to:

analyze the first image and the color-coded text-map images to detect visual features;

determine a first likelihood that a first location in the first image corresponds to the first text region of interest based on the CNN analysis;

determine a second likelihood that a second location in the first image corresponds to the second text region not of interest based on the CNN analysis;

classify at least one of the first location to be in the first text region based on the first likelihood or the second location to be in the second text region based on the second likelihood; and adjust a characteristic of the first image based on the classification.

2. The apparatus of claim 1, wherein the color-coded text-map images include a first color-coded text-map image and a second color-coded text-map image, the first color-coded text-map image including first color-coded segments of a first color, and the second color-coded text-map image including second color-coded segments of a second color.

3. The apparatus of claim 2, wherein the first color-coded segments correspond to a first text characteristic, and the second color-coded segments correspond to a second text characteristic.

4. The apparatus of claim 3, wherein the first color is different than the second color.

5. The apparatus of claim 1, wherein the CNN analysis identifies the second text region that is not of interest as separate from the first text region of interest when a same keyword appears in both the first text region of interest and the second text region that is not of interest.

6. The apparatus of claim 1, further including an interface to provide the color-coded text-map images to the CNN via a plurality of corresponding input channels of the CNN.

7. The apparatus of claim 1, wherein the first image is at least one of a food product label, a non-food product label, a sales receipt, a webpage, or a ticket.

8. The apparatus of claim 1, wherein the first text region of interest includes at least one of a nutrition facts table, a list of ingredients, a product description, candidate persons, numerical dates, or percentages.

9. At least one non-transitory computer readable medium comprising computer readable instructions to cause at least one processor circuit to at least:

generate text data from a first image, the first image including a first text region of interest and a second text region not of interest;

generate a plurality of color-coded text-map images, the color-coded text-map images including color-coded segments with different colors, the color-coded segments corresponding to different text characteristics;

analyze, via a convolutional neural network (CNN), the first image and the color-coded text-map images to detect visual features;

determine a first likelihood that a first location in the first image corresponds to the first text region of interest based on the CNN analysis;

determine a second likelihood that a second location in the first image corresponds to the second text region not of interest based on the CNN analysis;

classify at least one of the first location to be in the first text region based on the first likelihood or the second location to be in the second text region based on the second likelihood; and adjust a characteristic of the first image based on the classification.

10. The at least one non-transitory computer readable medium of claim 9, wherein the color-coded text-map images include a first color-coded text-map image and a second color-coded text-map image, the first color-coded text-map image including first color-coded segments of a first color, and the second color-coded text-map image including second color-coded segments of a second color.

11. The at least one non-transitory computer readable medium of claim 10, wherein the first color-coded segments correspond to a first text characteristic, and the second color-coded segments correspond to a second text characteristic.

12. The at least one non-transitory computer readable medium of claim 11, wherein the first color is different than the second color.

13. The at least one non-transitory computer readable medium of claim 9, wherein the computer readable instructions are to cause one or more of the at least one processor circuit to identify the second text region that is not of interest as separate from the first text region of interest when a same keyword appears in both the first text region of interest and the second text region that is not of interest.

14. The at least one non-transitory computer readable medium of claim 9, wherein the computer readable instructions are to cause one or more of the at least one processor circuit to provide the plurality of color-coded text-map images to the CNN via a plurality of corresponding input channels of the CNN.

15. The at least one non-transitory computer readable medium of claim 9, wherein the first image is at least one of a food product label, a non-food product label, a sales receipt, a webpage, or a ticket.

16. The at least one non-transitory computer readable medium of claim 9, wherein the first text region of interest includes at least one of a nutrition facts table, a list of ingredients, a product description, candidate persons, numerical dates, or percentages.

17. A method to analyze characteristics of text of interest, the method comprising:

generating text data from a first image, the first image including a first text region of interest and a second text region not of interest;

generating a plurality of color-coded text-map images, the color-coded text-map images including color-coded segments with different colors, the color-coded segments corresponding to different text characteristics;

analyzing, via a convolutional neural network (CNN), the first image and the color-coded text map images to detect visual features;

determining a first likelihood that a first location in the first image to the first text region of interest based on the CNN analysis;

determining a second likelihood that a second location in the first image corresponds to the second text region not of interest based on the CNN analysis;

classify at least one of the first location to be in the first text region based on the first likelihood or the second location to be in the second text region based on the second likelihood; and adjust a characteristic of the first image based on the classification.

18. The method of claim 17, wherein the color-coded text-map images include a first color-coded text-map image and a second color-coded text-map image, the first color-coded text-map image including first color-coded segments of a first color, and the second color-coded text-map image including second color-coded segments of a second color.

19. The method of claim 18, wherein the first color-coded segments correspond to a first text characteristic, and the second color-coded segments correspond to a second text characteristic.

20. The method of claim 19, wherein the first color is different than the second color.

\* \* \* \* \*